US012281628B2

(12) United States Patent
Zhu et al.

(10) Patent No.: US 12,281,628 B2
(45) Date of Patent: Apr. 22, 2025

(54) INTAKE ASSEMBLY

(71) Applicant: JCB Research, Uttoxeter (GB)

(72) Inventors: Frank Zhu, Uttoxeter (GB); Kevin Browne, Uttoxeter (GB); John Griffin, Uttoxeter (GB)

(73) Assignee: JCB Research, Uttoxeter (GB)

( * ) Notice: Subject to any disclaimer, the term of this patent is extended or adjusted under 35 U.S.C. 154(b) by 0 days.

(21) Appl. No.: 18/213,838

(22) Filed: Jun. 24, 2023

(65) Prior Publication Data

US 2023/0417207 A1 Dec. 28, 2023

(30) Foreign Application Priority Data

Jun. 24, 2022 (GB) ..................................... 2209322
Jun. 24, 2022 (GB) ..................................... 2209323

(51) Int. Cl.
*F02M 69/04* (2006.01)
*F02M 35/10* (2006.01)
(Continued)

(52) U.S. Cl.
CPC .... *F02M 35/112* (2013.01); *F02M 35/10216* (2013.01); *F02M 55/005* (2013.01);
(Continued)

(58) Field of Classification Search
CPC ........... F02M 35/10216; F02M 55/025; F02M 35/104; F02M 69/465; F02M 35/10072
(Continued)

(56) References Cited

U.S. PATENT DOCUMENTS 4,640,256 A 2/1987 Conrad et al.
6,817,337 B1 * 11/2004 Siring ............. F02M 35/10242 123/195 A (Continued)

FOREIGN PATENT DOCUMENTS

CN 203404000 U 1/2014
JP S5677548 A 6/1981

(Continued)

OTHER PUBLICATIONS

Extended European Search Report for EP 23180830.4, dated Oct. 25, 2023.

(Continued)

*Primary Examiner* — Long T Tran
*Assistant Examiner* — James J Kim
(74) *Attorney, Agent, or Firm* — MARSHALL, GERSTEIN & BORUN LLP

(57) ABSTRACT

An intake assembly for an internal combustion engine, includes an intake manifold including a first plenum and a plurality of intake runners, the first plenum including an air supply inlet, the intake runners configured to be couplable to a cylinder head of the engine for supplying an air-fuel mixture thereto, the intake manifold configured such that, in use, air is supplied from the air supply inlet to the intake runners via the first plenum; a plurality of fuel injectors, each arranged to inject a fuel into one of the intake runners; and a fuel rail coupled to the plurality of fuel injectors, the fuel rail including a fuel supply inlet, and configured to supply fuel from the fuel supply inlet to the plurality of fuel injectors, in use. The fuel rail is mounted to the first plenum.

20 Claims, 12 Drawing Sheets

(51) Int. Cl.
*F02M 35/112* (2006.01)
*F02M 55/00* (2006.01)
*F02M 55/02* (2006.01)
*F02M 61/14* (2006.01)

(52) U.S. Cl.
CPC ........ *F02M 55/025* (2013.01); *F02M 61/145* (2013.01); *F02M 2200/857* (2013.01); *F02M 2200/858* (2013.01)

(58) Field of Classification Search
USPC .......................................................... 123/445
See application file for complete search history.

(56) References Cited

U.S. PATENT DOCUMENTS

| | | | | |
|---|---|---|---|---|
| 7,210,461 | B2 * | 5/2007 | Schreeck | F02M 35/161 123/468 |
| 8,677,972 | B2 * | 3/2014 | Kim | F02M 35/112 123/195 A |
| 11,274,642 | B1 * | 3/2022 | Stewart | F02M 55/025 |
| 2002/0046736 | A1 * | 4/2002 | Bolsover | F02M 69/465 123/456 |
| 2005/0045155 | A1 * | 3/2005 | Harvey | F02M 35/10085 123/184.21 |
| 2013/0174814 | A1 | 7/2013 | Sugiyama | |
| 2014/0102415 | A1 * | 4/2014 | Wyban | F02M 63/029 123/456 |
| 2015/0059696 | A1 | 3/2015 | Frampton et al. | |
| 2016/0153409 | A1 * | 6/2016 | Sudo | F02M 35/104 123/184.61 |
| 2016/0177896 | A1 | 6/2016 | Snodgrass et al. | |
| 2017/0022951 | A1 * | 1/2017 | Serra | F02M 55/005 |
| 2017/0314524 | A1 * | 11/2017 | Hoban | F02P 17/12 |
| 2020/0166012 | A1 * | 5/2020 | Jung | F02M 55/02 |

FOREIGN PATENT DOCUMENTS

| | | | |
|---|---|---|---|
| JP | S6174672 | U | 5/1986 |
| JP | 2001207940 | A | 8/2001 |
| JP | 2020008025 | A | 1/2020 |
| KR | 101338604 | B1 | 12/2013 |
| WO | WO-97/27393 | A1 | 7/1997 |
| WO | WO-02/097259 | A1 | 12/2002 |

OTHER PUBLICATIONS

Examination and Search Report issued in GB 2209322.3, dated Nov. 29, 2022.

Examination and Search Report issued in GB 2209323.1, dated Nov. 29, 2022.

* cited by examiner

INTAKE ASSEMBLY

FIELD

The present teachings relate to an intake assembly for an internal combustion engine, a preassembled fuel rail unit, an internal combustion engine, and a working machine.

BACKGROUND

Air is typically supplied to a cylinder of an internal combustion engine via an intake runner. The intake runner may form part of an intake manifold in which a plurality of intake runners are supplied with air from a plenum. Each intake runner typically supplies air to a single cylinder of the engine.

Internal combustion engines are known in which fuel is supplied to a cylinder of the engine via port fuel injection, in which fuel is injected into an intake manifold upstream of the cylinder. This is in contrast to direct fuel injection, in which fuel is injected directly into the cylinder.

Typically, such intake manifolds include a plurality of intake runners configured to supply a mixture of fuel and air into a cylinder head of the engine, from where it is supplied to the engine's cylinders for combustion. Fuel injectors are arranged to inject fuel into the intake runners.

It is known to supply fuel to the plurality of fuel injectors via a common fuel rail. A problem with such an assembly of an intake manifold, fuel injectors and a fuel rail is that the fuel rail can be difficult to assemble when manufacturing the engine or access for maintenance and inspection when the engine is mounted in a vehicle. Moreover, it is common for such intake assemblies to require a large amount of space in the vehicle within which they are mounted due to their shape and size.

In engines using port fuel injection, it is known to inject fuel into an intake runner, such that the fuel can mix with air passing through the intake runner before reaching the cylinder for combustion. A problem with such intake runners is that the air and the fuel may not mix as desired by the time they reach the cylinder to ensure optimal combustion efficiency. This problem may be less acute when the fuel is a gaseous fuel such as hydrogen, but in this case further issues may exist with the structure and/or geometry that facilitates the injection.

The present teachings seek to overcome or at least mitigate one or more problems associated with the prior art.

SUMMARY

The present invention provides an intake assembly for an internal combustion engine according to the appended claims.

According to a first aspect of the present teachings, there is provided an intake assembly for an internal combustion engine, comprising:

- an intake manifold including a first plenum and a plurality of intake runners, the first plenum comprising an air supply inlet, the intake runners configured to be couplable to a cylinder head of the engine for supplying an air-fuel mixture thereto, the intake manifold configured such that, in use, air is supplied from the air supply inlet to the intake runners via the first plenum;
- a plurality of fuel injectors, each arranged to inject a fuel into one of the intake runners; and

- a fuel rail coupled to the plurality of fuel injectors, the fuel rail including a fuel supply inlet, and configured to supply fuel from the fuel supply inlet to the plurality of fuel injectors, in use, wherein the fuel rail is mountable to the first plenum.

Advantageously, mounting the fuel rail to the first plenum of the intake manifold enables the intake manifold, the fuel rail and the fuel injectors to be preassembled separately to the remainder of the engine, which reduces the time and complexity of assembling the engine.

Moreover, since the first plenum may be spaced more from the cylinder head of the engine relative to the intake runners for example, in use, the first plenum, and thus the fuel rail, may be easier to access than other portions of the intake manifold to help simplify assembly, inspection or maintenance of the fuel rail.

The intake manifold may comprise a second plenum in fluid communication with the first plenum and the intake runners. The intake runners may extend from the second plenum. The first plenum may be arranged above the second plenum.

Advantageously, such a configuration helps to improve the compactness of the intake manifold. Moreover, by mounting the fuel rail to the first plenum that is arranged above the second plenum, in use, the first plenum, and thus the fuel rail, may be easier to access than other portions of the intake manifold to help further simplify assembly, inspection or maintenance of the fuel rail.

The first plenum may be elongate extending along a first longitudinal axis. The second plenum may be elongate extending along a second longitudinal axis. The first longitudinal axis and the second longitudinal axis may be substantially parallel to each other.

Advantageously, such a configuration helps to improve the compactness of the intake manifold.

The fuel injectors may be receivable in respective openings in the intake runners. The fuel injectors may be inhibited from exiting the respective openings via the mounting of the fuel rail to the first plenum.

Advantageously, such a configuration negates the need to separately secure the fuel injectors to the intake manifold, simplifying assembly of the intake assembly.

The fuel rail and the fuel injectors may be configured such that the fuel injectors are mountable to the fuel rail prior to the mounting of the fuel rail to the first plenum. The plurality of fuel injectors may be coupled to the fuel rail as a preassembled unit prior to being mounted to the first plenum and intake runners Advantageously, such a configuration enables the fuel rail and the fuel injectors to be preassembled separately to the remainder of the intake assembly, which reduces the time and complexity of assembling the intake assembly.

The intake runners may comprise a closed wall having a protrusion formed as a monolithic structure, the protrusion comprising a fuel injection passage in fluid communication with the respective opening and passing through the protrusion to a fuel orifice in an airflow path of the intake runner. The fuel injection passage may include a first linear portion connected to a second linear portion. The first linear portion may be adjacent a fuel orifice and the second linear portion being adjacent the respective opening. A longitudinal axis of the first linear portion and a longitudinal axis of the second linear portion may form an internal obtuse angle. The first linear portion may direct fuel from the injector in a direction aligned with an airflow path in the intake runner.

The intake assembly may be configured such that the fuel injectors extend from the fuel rail substantially parallel to an axis of piston motion of the engine.

Advantageously, such a configuration may help to improve the compactness of an engine assembly including the intake assembly.

The fuel rail may be removably mounted to the first plenum via one or more brackets attached to the fuel rail.

Advantageously, removably mounting the fuel to the first plenum via the one or more brackets enables the fuel rail to be rapidly mounted/dismounted to/from the intake manifold.

The one or more brackets may be removably securable to the first plenum via one or more mechanical fasteners, such as bolts or threaded studs and nuts.

Advantageously, removably securing the one or more brackets to the first plenum via one or more mechanical fasteners enables rapid mounting/demounting of the fuel rail to/from the first plenum. If studs are used, these may further assist with guiding the fuel rail and injectors into the correct position during assembly.

The fuel injectors may extend from the fuel rail substantially parallel to a longitudinal axis of each of the one or more mechanical fasteners.

Advantageously, such a configuration may help ensure that the one or more mechanical fasteners robustly clamp the fuel injectors in position between the intake manifold and intake runners.

The fuel injectors may be transversely offset from the one or more mechanical fasteners.

The fuel rail may be removably mountable to the first plenum via two or more brackets attached to the fuel rail. Each bracket may comprise a bore. The intake manifold may comprise two or more threaded studs extending from the first plenum. Each stud may be receivable in one of the bores and securable thereto via a nut at a distal portion of the threaded stud, to secure the bracket to the first plenum.

Advantageously, such a configuration provides a strong and reliable connection between the fuel rail and the first plenum.

The studs may extend substantially vertically upwards from the first plenum.

The fuel rail may comprise an elongate supply conduit, the fuel rail configured to supply fuel from the fuel supply inlet to the plurality of fuel injectors via the supply conduit, in use. The one or more brackets may be attached to the supply conduit.

Advantageously, such a configuration of the fuel rail and the one or more brackets helps to provide a robust connection between the fuel rail and the first plenum, whilst helping to provide a compact design of the intake assembly.

The first plenum may be elongate extending along a first longitudinal axis. The supply conduit may extend substantially parallel to said first longitudinal axis.

The second bore of each bracket may extend substantially perpendicular to a longitudinal axis of the supply conduit. A length of each second bore may be greater than a transverse width of the supply conduit.

Advantageously, such a configuration helps to provide a rigid and robust connection between fuel rail and the intake manifold.

The one or more brackets may be attached to the fuel rail via a metal joining process, such as welding.

Advantageously, such a configuration helps to provide a rigid and robust connection between the one or more brackets and the fuel rail.

The fuel rail may be removably mounted to the first plenum via a plurality of the brackets.

Advantageously, such a configuration helps to provide a rigid and robust connection between the fuel rail and the first plenum.

The brackets may be spaced from each other along a longitudinal axis of the fuel rail.

The fuel rail may be mounted to one or more mounting surfaces of the first plenum. The one or more mounting surfaces may be arranged to face substantially upwards, in use.

Advantageously, the upward facing mounting surfaces may help to simplify mounting/dismounting of the fuel rail to/from the intake manifold, in use.

Advantageously, the one or more substantially planar mounting surfaces may act as an alignment feature, to help ensure proper orientation of the fuel rail, and thus the fuel injectors, relative to the intake manifold.

The one or more mounting surfaces may be substantially planar.

The fuel rail may be mounted to one or more mounting surfaces of the first plenum. The one or more mounting surfaces may be arranged below an uppermost extent of the first plenum, in use.

Advantageously, arranging the one or more mounting surfaces below an uppermost extent of the first plenum, in use, may help to enhance the compactness of the intake assembly.

The one or more mounting surfaces may be arranged at least one quarter of a distance from the uppermost extent of the first plenum towards a lowermost extent of the first plenum, in use.

The first plenum may comprise a closed wall enclosing a cavity, the cavity in fluid communication with the air supply inlet and the intake runners. The first plenum may further comprise one or more mounting platforms extending from the closed wall. Each mounting platform may comprise at least one of the one or more mounting surfaces.

Advantageously, the mounting platforms may help to provide a robust and rigid connection between the first plenum and the fuel rail.

The intake assembly may further comprise a plurality of sealing members, such as O-rings, arranged to seal interfaces between the fuel injectors and the fuel rail, and/or the fuel injectors and the corresponding intake runners. The intake assembly may be configured such that the mounting of the fuel rail to the first plenum aligns the sealing members concentrically and coaxially with the fuel rail and/or the intake runners respectively, at the interfaces thereof, to provide gas-tight seals.

The fuel rail may be configured to supply a gaseous fuel, such as hydrogen, to the fuel injectors. The fuel injectors may be configured to inject said gaseous fuel into the intake runners.

The fuel rail may comprise an elongate supply conduit and a plurality of supply channels extending therefrom. The supply conduit may comprise the fuel supply inlet. Each supply channel may be coupled to one of the fuel injectors for supplying fuel from the fuel supply inlet to the respective fuel injector via the supply conduit.

The supply channels may extend substantially transversely to a longitudinal axis of the supply conduit.

The supply channels may extend from the supply conduit substantially parallel to each other.

The fuel rail may be arranged above the intake runners.

Advantageously, such a configuration may help to enhance access to the fuel rail, in use, for maintenance or inspection.

According to a second aspect of the present teachings, there is provided a preassembled fuel rail unit for an internal combustion engine, comprising:

a plurality of fuel injectors, each arranged to inject a fuel into an intake manifold of the engine;

a fuel rail coupled to the plurality of fuel injectors, the fuel rail including a fuel supply inlet, and configured to supply fuel from the fuel supply inlet to the plurality of fuel injectors, in use; and a bracket attached to the fuel rail for mounting the fuel rail to the intake manifold, wherein the fuel injectors extend from the fuel rail in a common direction and along substantially parallel injector axes, wherein the bracket comprises a bore for receiving at least a portion of a mechanical fastener therein, a longitudinal axis of the bore being parallel to the injector axes.

Advantageously, the configuration of the bore and the fuel injectors may help ensure proper alignment of the fuel rail unit relative to an intake manifold when the bracket is mounted to the intake manifold.

The bore may extend through a planar mounting surface of the bracket. The mounting surface may face the common direction.

Advantageously, the mounting surface of the bracket may help ensure proper alignment of the fuel rail unit relative to an intake manifold when the bracket is mounted to the intake manifold.

The mounting surface may be substantially perpendicular to the injector axes.

According to a third aspect of the present teachings, there is provided an internal combustion engine or cylinder head comprising the intake assembly according to the first aspect of the present teachings or the preassembled fuel rail unit according to the second aspect of the present teachings.

The internal combustion engine or cylinder head may be configured to be powered by a gaseous fuel, such as hydrogen.

The internal combustion engine may further comprise a cylinder block. The fuel rail may be arranged above the cylinder block in use.

The internal combustion engine may comprise a cylinder head mounted to the cylinder block. The fuel rail may be arranged above the cylinder head, in use.

Advantageously, such a configuration may help to enhance access to the fuel rail, in use, for maintenance or inspection.

According to a fourth aspect of the present teachings, there is provided a working machine or an electric genset comprising the intake assembly according to the first aspect of the present teachings, the preassembled fuel rail unit according to the second aspect of the present teachings, or the internal combustion engine or cylinder head according to the third aspect of the present teachings.

Working machines and gensets of the type described below package internal combustion engines in various configurations depending upon the layout of the working machine. It is therefore advantageous to have an internal combustion engine with compact dimensions so as to maximize the flexibility to mount ancillary components such as cooling and exhaust aftertreatment systems in multiple arrangements around the internal combustion engine.

According to a fifth aspect of the present teachings, there is provided an intake runner for an internal combustion engine, comprising:

an air inlet portion, an outlet portion, and an intake passage configured to transport air from the air inlet portion to the outlet portion, wherein the intake runner comprises a first protrusion projecting into the intake passage, the first protrusion configured to disrupt air flowing along the intake passage from the air inlet portion to the outlet portion, wherein the first protrusion comprises a first fuel orifice within the intake passage, the first fuel orifice configured to inject a fuel therefrom into the intake passage.

Advantageously, the protrusion may help to enhance mixing of the air and the fuel in the intake passage downstream of the protrusion, especially when the fuel is a gaseous fuel such as hydrogen, which may help to improve the combustion performance of the engine.

The intake runner may comprise a closed wall defining the intake passage. The protrusion and the closed wall may be formed as a single monolithic piece of material, e.g. a single casting or single forging.

Advantageously, forming the closed wall and the protrusion as a single monolithic piece of material helps to ensure a robust and strong connection between the closed wall and the protrusion, and helps to reduce the number of separate components of the intake runner, potentially also saving costs.

A cross-sectional area of the protrusion in a plane normal to the flow direction may be a proportion of the corresponding total cross-sectional area of the intake passage in the range of 5% to 25%, optionally 10% to 20%, for example 16%.

This has been found to minimize pressure drop and maintain efficiency whilst assisting effective fuel-air mixing.

The intake runner may comprise a second protrusion projecting into the intake passage. The second protrusion may be configured to disrupt air flowing along the intake passage from the air inlet portion to the outlet portion. The second protrusion may comprise a second fuel orifice within the intake passage. The second fuel orifice may be configured to inject a fuel therefrom into the intake passage, in use.

Advantageously, such a configuration helps to increase the amount of fuel that may be injected into the intake passage whilst using a standard size of injectors, e.g. injectors designed for use with hydrogen fuel.

The intake runner may further comprise a fuel injection passage for supplying fuel to the fuel orifice. The fuel orifice may provide an outlet to the fuel injection passage. The fuel injection passage and the fuel orifice may be configured to direct fuel exiting the fuel orifice in a direction substantially towards the outlet portion.

Advantageously, such a configuration helps to enhance mixing of fuel and air in the intake passage downstream of the fuel orifice and reduce the risk of backflow of fuel into an inlet manifold upstream of the inlet runner.

The fuel injection passage may pass through the protrusion.

The fuel injection passage may have a portion with an axis directing the fuel exiting the fuel orifice in a direction substantially towards the outlet portion.

Advantageously, such a configuration helps to enhance mixing of fuel and air in the intake passage downstream of the fuel orifice.

A longitudinal axis of the fuel injection passage may be oriented at an angle to a mean flow direction of the air and/or the horizontal, in the range of 0 to 25 degrees, optionally in the range of 10 to 20 degrees, for example 14 degrees.

Advantageously, such orientations of the fuel injection passage have been found to provide good mixing between fuel and air, and to inhibit backflow of fuel exiting the fuel orifice, in use.

The intake runner may further comprise an opening in an external surface of the intake runner for receiving an injector tip of a fuel injector therein. The fuel injection passage may be in fluid communication with the opening such that, in use, a fuel injected into the first opening is injected into the intake passage via the first fuel orifice.

Advantageously, such a configuration may help to reduce the distance fuel exiting the injector tip needs to travel to reach the fuel orifice, and may help to ensure a compact design of the intake runner.

The intake runner may further comprise a fuel injector including an injector tip. The injector tip may be received in the opening. The fuel injector may be configured to inject a gaseous fuel, such as hydrogen, from the injector tip into the opening.

The fuel injection passage may comprise a first linear portion connected to a second linear portion. The first linear portion may be adjacent the fuel orifice. The second linear portion may be adjacent the opening. A longitudinal axis of the first linear portion and a longitudinal axis of the second linear portion may form an internal obtuse angle.

Advantageously, such a configuration of the fuel injection passage may help to enhance the turbulence of fuel travelling through the fuel injection passage, especially when the fuel is a gaseous fuel such as hydrogen, which may help to enhance mixing of the fuel and air in the intake passage. Moreover, such a configuration may help to ensure fuel is injected into the intake passage in a direction which enhances mixing of the fuel and the air, whilst helping to ensure a compact design of the intake runner.

The fuel injection passage may comprise a linear portion adjacent the opening. A longitudinal axis of the opening may be aligned with a longitudinal axis of said linear portion. A cross-sectional area of the opening along the longitudinal axis thereof may be greater than a cross-sectional area of said linear portion along the longitudinal axis thereof.

Advantageously, such a configuration may help to increase the pressure of the fuel exiting a fuel injector received in the opening and passing through the fuel injection passage, which may help to enhance mixing of fuel and air in the intake passage. Moreover, such a configuration may help to ensure a compact design of the intake runner.

The opening and the fuel orifice may be substantially offset from a center plane of the intake passage. The center plane may be substantially parallel to a longitudinal axis of the opening.

Advantageously, such a configuration of the opening and the fuel orifice may enable another aspect of the intake runner, such as a means for mounting the intake runner to a cylinder head of an engine for example, to be located adjacent the opening and/or fuel orifice in a space efficient manner.

The intake runner may further comprise an aperture for receiving a mechanical fastener, such as a bolt, therein for mounting a portion of the intake runner to a cylinder head of the engine for supplying fuel and air thereto. The aperture may be arranged adjacent the opening and the fuel orifice, and on an opposite side of the center plane relative to the opening and the fuel orifice.

Advantageously, such a configuration helps to ensure a compact design of the intake runner.

A longitudinal axis of the aperture may be substantially parallel to a mean flow direction of the air passing through the intake passage and/or substantially perpendicular to a longitudinal axis of the opening.

The intake passage may have a substantially rectangular profile along a direction from the air inlet portion to the outlet portion. The fuel orifice may be arranged in a corner of said rectangular profile.

Advantageously, such a configuration helps to ensure a compact design of the intake runner.

The intake runner may comprise a closed wall defining the intake passage. The closed wall may comprise the external surface of the intake runner. The opening may be wholly within said wall.

Advantageously, such a configuration helps to ensure a compact design of the intake runner.

A longitudinal axis of the opening may be substantially perpendicular to the mean flow direction of the air passing through the intake passage.

Advantageously, such a configuration helps to ensure a compact design of the intake runner.

According to a sixth aspect of the present teachings, there is provided an intake runner for an internal combustion engine, comprising:

an air inlet portion, an outlet portion, and an intake passage configured to transport air from the air inlet portion to the outlet portion, wherein the intake runner comprises a fuel orifice configured to inject a fuel therefrom into the intake passage, and a fuel injection passage for supplying a fuel to the fuel orifice, the fuel orifice providing an outlet to the fuel injection passage, and wherein the fuel injection passage and the fuel orifice are configured to direct fuel exiting the fuel orifice in a direction substantially towards the outlet portion.

A longitudinal axis of the fuel injection passage may be oriented at an angle to a mean flow direction of the air and/or the horizontal, in use, in the range of 0 to 25 degrees, optionally in the range of 10 to 20 degrees, for example 14 degrees.

Advantageously, such orientations of the fuel injection passage have been found to provide good mixing between fuel and air, and to inhibit backflow of fuel exiting the fuel orifice, in use.

The intake runner may further comprise an opening in an external surface of the intake runner for receiving an injector tip of a fuel injector therein. The fuel injection passage may be in fluid communication with the opening such that, in use, a fuel injected into the first opening is injected into the intake passage via the first fuel orifice.

Advantageously, such a configuration may help to reduce the distance fuel exiting the injector tip needs to travel to reach the fuel orifice, and may help to ensure a compact design of the intake runner.

The intake runner may further comprise a fuel injector including an injector tip. The injector tip may be received in the opening. The fuel injector may be configured to inject a gaseous fuel, such as hydrogen, from the injector tip into the opening.

The fuel injection passage may comprise a first linear portion connected to a second linear portion. The first linear portion may be adjacent the fuel orifice. The second linear portion may be adjacent the opening. A longitudinal axis of the first linear portion and a longitudinal axis of the second linear portion may form an internal obtuse angle.

Advantageously, such a configuration of the fuel injection passage may help to enhance the turbulence of fuel travelling through the fuel injection passage, especially when the fuel is a gaseous fuel such as hydrogen, which may help to enhance mixing of the fuel and air in the intake passage. Moreover, such a configuration may help to ensure fuel is injected into the intake passage in a direction which enhances mixing of the fuel and the air, whilst helping to ensure a compact design of the intake runner.

The fuel injection passage may comprise a linear portion adjacent the opening. A longitudinal axis of the opening may be aligned with a longitudinal axis of said linear portion. A cross-sectional area of the opening along the longitudinal axis thereof may be greater than a cross-sectional area of said linear portion along the longitudinal axis thereof.

Advantageously, such a configuration may help to increase the pressure of the fuel exiting a fuel injector received in the opening and passing through the fuel injection passage, which may help to enhance mixing of fuel and air in the intake passage. Moreover, such a configuration may help to ensure a compact design of the intake runner.

The opening and the fuel orifice may be substantially offset from a center plane of the intake passage. The center plane may be substantially parallel to a longitudinal axis of the opening.

Advantageously, such a configuration of the opening and the fuel orifice may enable another aspect of the intake runner, such as a means for mounting the intake runner to a cylinder head of an engine for example, to be located adjacent the opening and/or fuel orifice in a space efficient manner.

The intake runner may further comprise an aperture for receiving a mechanical fastener, such as a bolt, therein for mounting a portion of the intake runner to a cylinder head of the engine for supplying fuel and air thereto. The aperture may be arranged adjacent the opening and the fuel orifice, and on an opposite side of the center plane relative to the opening and the fuel orifice.

Advantageously, such a configuration helps to ensure a compact design of the intake runner.

A longitudinal axis of the aperture may be substantially parallel to a mean flow direction of the air passing through the intake passage and/or substantially perpendicular to a longitudinal axis of the opening.

The intake passage may have a substantially rectangular profile along a direction from the air inlet portion to the outlet portion. The fuel orifice may be arranged in a corner of said rectangular profile.

Advantageously, such a configuration helps to ensure a compact design of the intake runner.

The intake runner may comprise a closed wall defining the intake passage. The closed wall may comprise the external surface of the intake runner. The opening may be wholly within said wall.

Advantageously, such a configuration helps to ensure a compact design of the intake runner.

A longitudinal axis of the opening may be substantially perpendicular to the mean flow direction of the air passing through the intake passage.

Advantageously, such a configuration helps to ensure a compact design of the intake runner.

According to a seventh aspect of the present teachings, there is provided an internal combustion engine or a cylinder head of an internal combustion engine comprising: the intake runner according to the first or second aspects of the present teachings; an intake port including an inlet leading to a cylinder of the engine; and an inlet valve configured to selectively open and close the inlet, wherein the outlet portion of the intake runner leads to the intake port.

The intake runner may comprise a fuel injection passage for supplying a fuel to the fuel orifice, the fuel orifice providing an outlet to the fuel injection passage. The fuel injection passage and the fuel orifice may be configured to direct fuel exiting the fuel orifice in a direction substantially towards the outlet portion. The intake port may have a width along an axis of the inlet valve. A longitudinal axis of the fuel injection passage at the fuel orifice may intersect the axis of the inlet valve at a position greater than 50%, optionally greater than 60%, optionally greater than 70%, of the width of the intake port from the inlet.

The internal combustion engine may further comprise an intake manifold comprising a plenum, the plenum leading to the air inlet portion.

A minimum distance between the fuel orifice and the inlet valve may be a proportion of a minimum distance between a longitudinal axis of the plenum and the inlet valve, in the range of 45% to 75%, optionally in the range of 55% to 65%, for example 59%.

An upstream portion of the intake runner and the plenum may be formed as a single monolithic piece of material, e.g. a single casting or single forging, said upstream portion comprising the air inlet portion.

According to an eighth aspect of the present teachings, there is provided a working machine or electric genset comprising the intake runner according to the first or second aspects of the present teachings, or the internal combustion engine or cylinder head according to the fourth aspect of the present teachings.

Working machines and gensets of the type described below package internal combustion engines in various configurations depending upon the layout of the working machine. It is therefore advantageous to have an internal combustion engine with compact dimensions so as to maximize the flexibility to mount ancillary components such as cooling and exhaust aftertreatment systems in multiple arrangements around the internal combustion engine.

According to a ninth aspect of the present teachings, there is provided a method of manufacturing an intake runner for an internal combustion engine, the method comprising the steps of:

forming an intake runner via a casting or forging process, the intake runner comprising an air inlet portion, an outlet portion, an intake passage configured to transport air from the air inlet portion to the outlet portion, and a protrusion projecting into the intake passage and configured to disrupt air flowing along the intake passage from the air inlet portion to the outlet portion, wherein the intake runner comprises a wall defining the intake passage, and wherein the protrusion and said wall are formed as a single monolithic piece of material;

machining an opening in an external surface of the intake runner for receiving an injector tip of a fuel injector therein; and machining a fuel orifice in the protrusion, the fuel orifice within the intake passage, wherein the fuel orifice is in fluid communication with the opening such that, in use, a fuel injected into the opening is injected into the intake passage via the fuel orifice.

The method may further comprise the steps of:

machining a fuel injection passage in the intake runner, wherein the fuel injection passage is in fluid communication with the opening, and the fuel orifice provides an outlet to the fluid injection passage, such that, in use, a fuel injected into the opening is injected into the intake passage via the fuel injection passage.

The step of machining the fuel injection passage in the intake runner may include machining the fuel orifice in the protrusion.

According to a tenth aspect of the present teachings there is provided a cylinder head or engine incorporating one or more of the features of the intake runner of the fifth aspect, intake runner of the sixth aspect, intake assembly of the seventh aspect, or pre-assembled unit of the eighth aspect

BRIEF DESCRIPTION OF THE DRAWINGS

Embodiments are now disclosed by way of example only with reference to the drawings, in which.

DETAILED DESCRIPTION OF EMBODIMENT(S)

In the following detailed description, numerous specific details are set forth in order to provide a thorough understanding of various embodiments and the teachings. However, those skilled in the art will understand that: the present teachings may be practiced without these specific details or with known equivalents of these specific details; that the present teachings are not limited to the described embodiments; and, that the present teachings may be practiced in a variety of alternative embodiments. It will also be appreciated that well known methods, procedures, components, and systems may not have been described in detail.

Figure 1A:
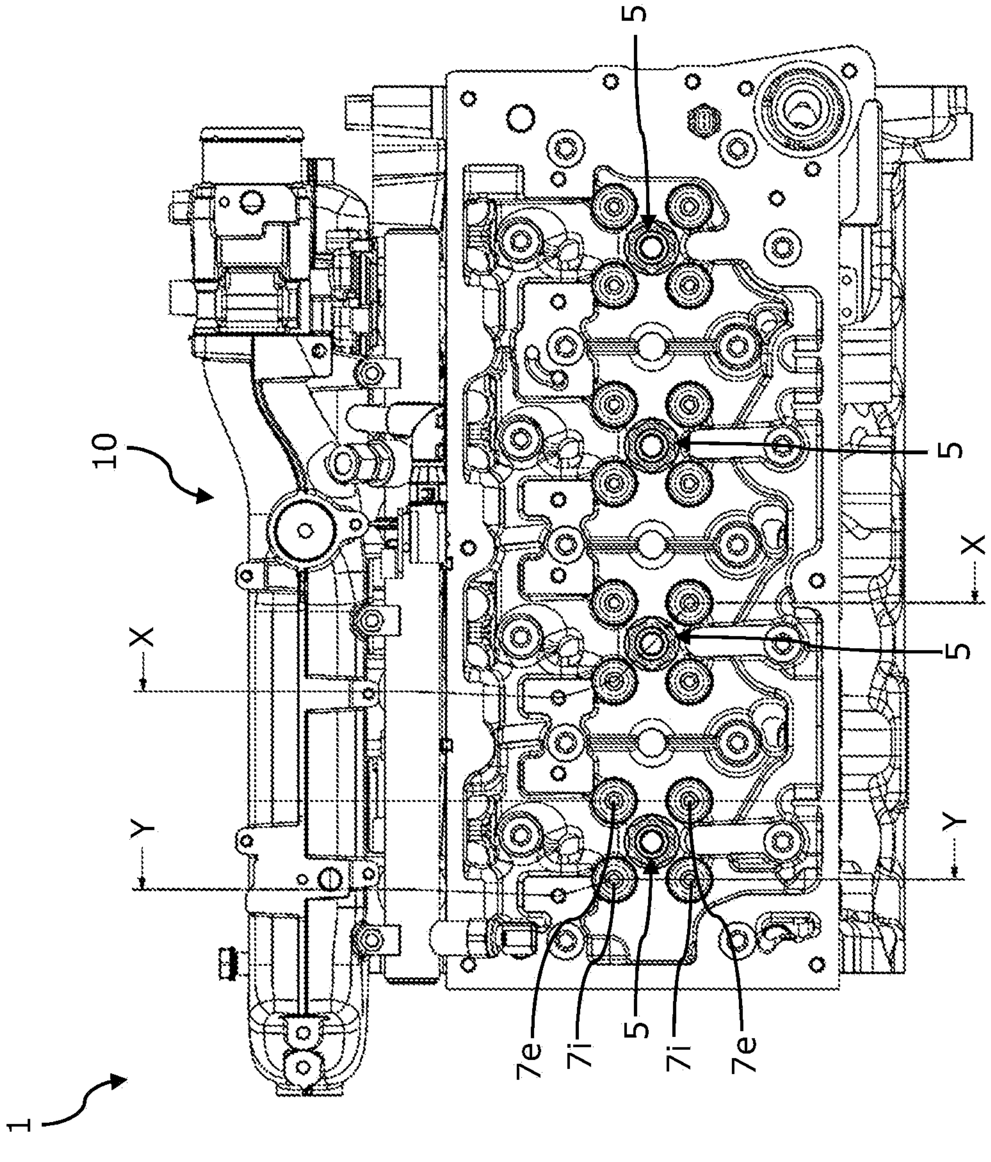
FIG. 1A is a plan view of an internal combustion engine according to an embodiment of the present teachings.
Figure 1B:
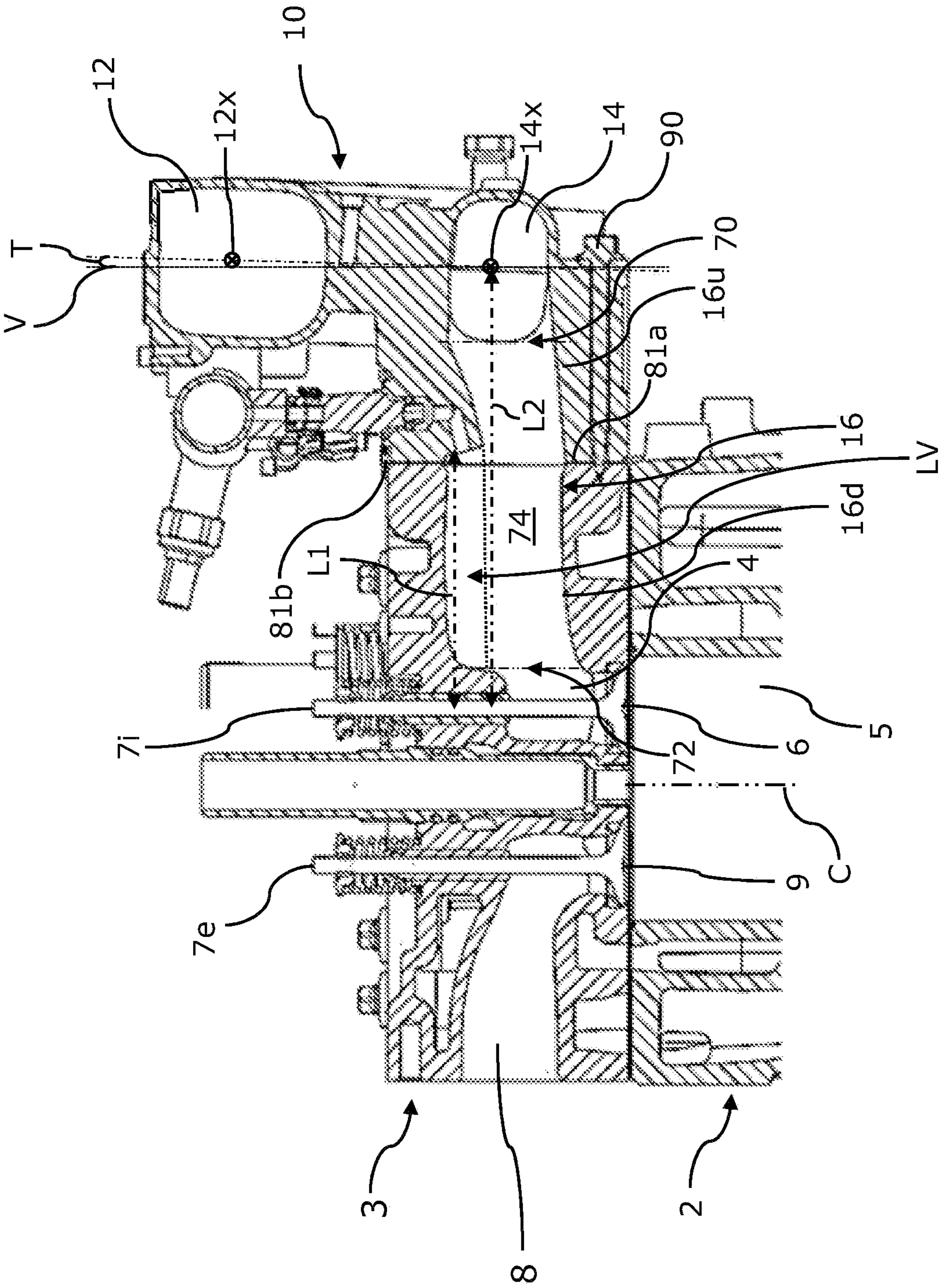
FIG. 1B is a cross-sectional view of the internal combustion engine along section X-X shown in FIG. 1A.
Figure 1C:
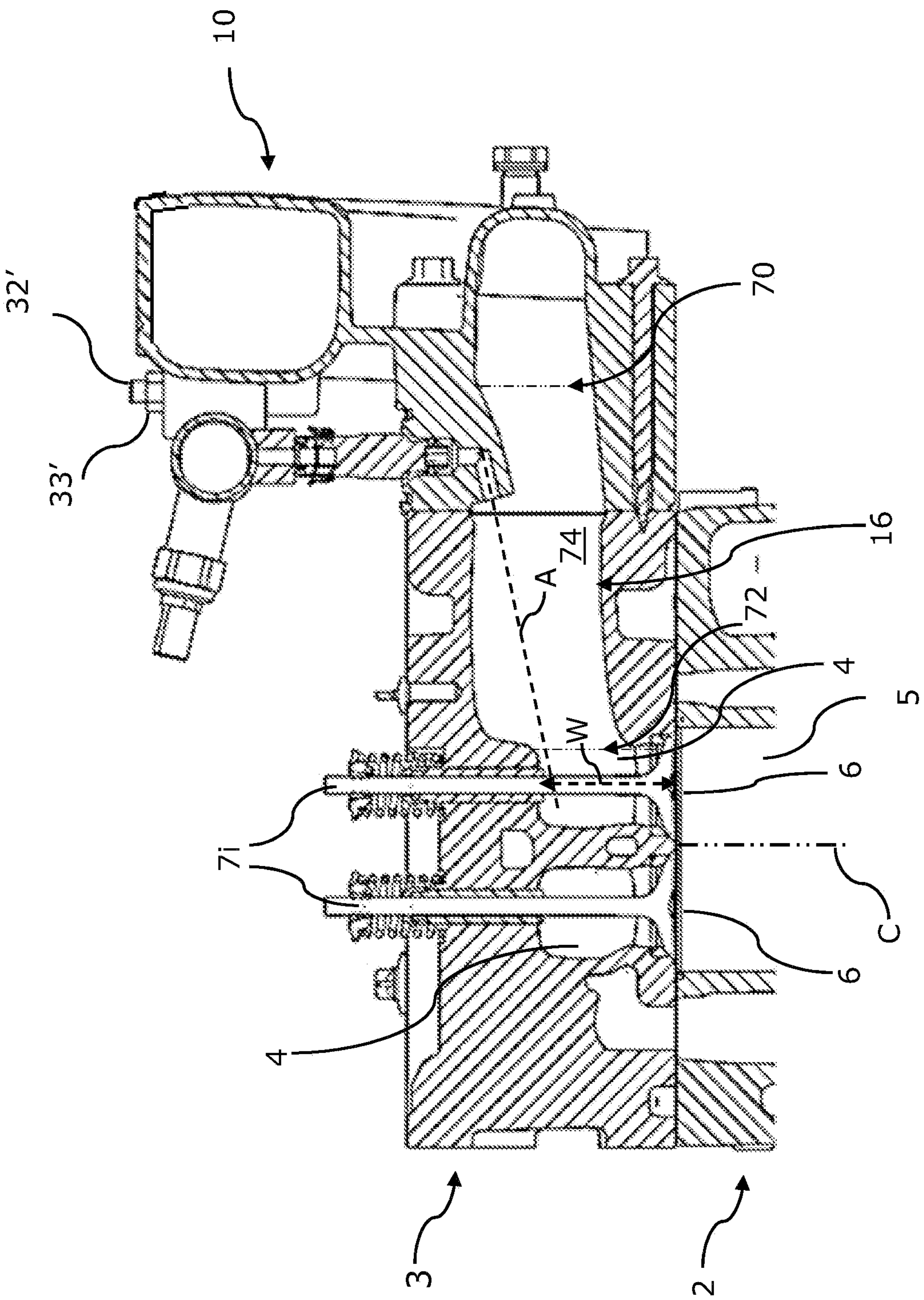
FIG. 1C is a cross-sectional view of the internal combustion engine along section Y-Y shown in FIG. 1A.

Referring firstly to FIGS. 1A to 1C, an embodiment includes an internal combustion engine 1. FIG. 1A shows a plan view of the engine 1, FIG. 1B shows a cross-sectional view of the engine 1 along section X-X shown in FIG. 1A, and FIG. 1C shows a cross-sectional view of the engine 1 along section Y-Y shown in FIG. 1A.

In this embodiment, the engine 1 is configured to be powered by a gaseous fuel, such as hydrogen, compressed natural gas (CNG), landfill gas or the like. In alternative embodiments, the engine 1 may be configured to be powered by liquid fuels such as petroleum (gasoline) or diesel for example, or by a combination of liquid and gaseous fuels. The engine in this embodiment has four cylinders indicated generally at 5, but in other embodiments may have more or fewer cylinders, e.g. 2, 3, 6, or 8. In addition in other embodiments the cylinders may be oriented in a "V" or boxer configuration rather than inline as in the disclosed embodiment.

The engine 1 may be suitable for use as the prime mover in a working machine (not shown), such as a telescopic handler, a forklift truck, a backhoe loader, a wheeled loading shovel, a dumper, an excavator or a tractor, for example. Such working machines are suitable for use in off-highway industries such as agriculture and construction. In these industries they are generally configured to perform tasks such as excavation, load handling, harvesting or planting crops. As such the engine is typically required to have certain characteristics such as a high torque output over a wide engine speed band which differ from light passenger vehicles, for example. In addition, the engine 1 may be suitable for use in a genset—i.e. to be connected to an electrical generator as a self-contained unit to provide electrical power where a mains supply is not available.

FIGS. 1B and 1C show the typical orientation of the engine 1 when implemented in a vehicle such as a working machine or a genset, in use, with the axis C of the cylinders substantially vertical. However, in some embodiments the cylinders may be orientated at an inclined angle with respect to the vertical.

The engine 1 comprises a cylinder block 2, a cylinder head 3, and an intake assembly 10. The cylinder head 3 is mounted to the cylinder block 2. The intake assembly 10 is mounted to the cylinder head 3. The engine 1 is configured such that the intake assembly 10 supplies a mixture of air and fuel to a plurality of intake ports 4 of the cylinder head 3. The air-fuel mixture is then supplied from the intake ports 4 to the corresponding cylinders 5 of the cylinder block 2 in a known manner. As such, the engine 1 is a port fuel injection engine (i.e. fuel is provided to the cylinders 5 via port fuel injection).

The engine 1 comprises a plurality of intake runners 16 configured to supply a mixture of air and fuel from the intake assembly 10 to the intake ports 4. The cylinder head 3 comprises downstream portions 16*d* of the intake runners 16. Each downstream portion 16*d* leads to one of the intake ports 4.

Figure 1D:
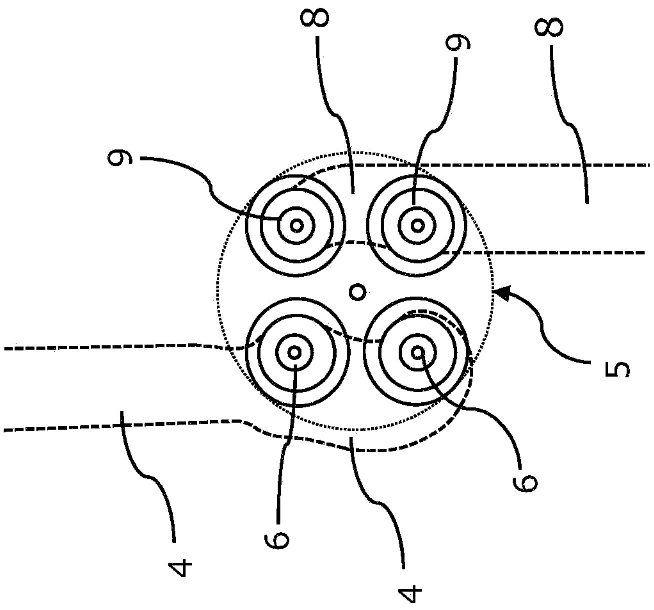
FIG. 1D is a plan view of a cylinder, an intake port and an exhaust port of the internal combustion engine of FIG. 1A.

With further reference to FIG. 1D, which shows a plan view of one of the cylinders 5, each intake port 4 bifurcates at its downstream end so the fuel-air mixture enters the cylinder 5 via two inlets 6 that are selectively opened and closed by two inlet valves 7*i*. In other embodiments (not shown) a non-bifurcating intake port and single inlet valve may however be utilized.

The cylinder head 3 further includes a plurality of exhaust ports 8 arranged to transport exhaust gases away from each cylinder 5. The exhaust ports 8 bifurcate at their upstream end so the exhaust gases leave the cylinder 5 via two outlets 9 that are selectively opened and closed by two exhaust valves 7*e*. In other embodiments (not shown) a non-bifurcating exhaust port and single exhaust valve may however be utilized.

In this embodiment the cylinder(s) 5 have a flat roof and the inlet 7*i* and exhaust 7*e* valves are arranged to open and close via movement along axes that are parallel to the cylinder axes C. In other embodiments the cylinders may have e.g. a pent-roof or hemispheric roof and the valves may have exes that are inclined with respect to C.

Figure 2:
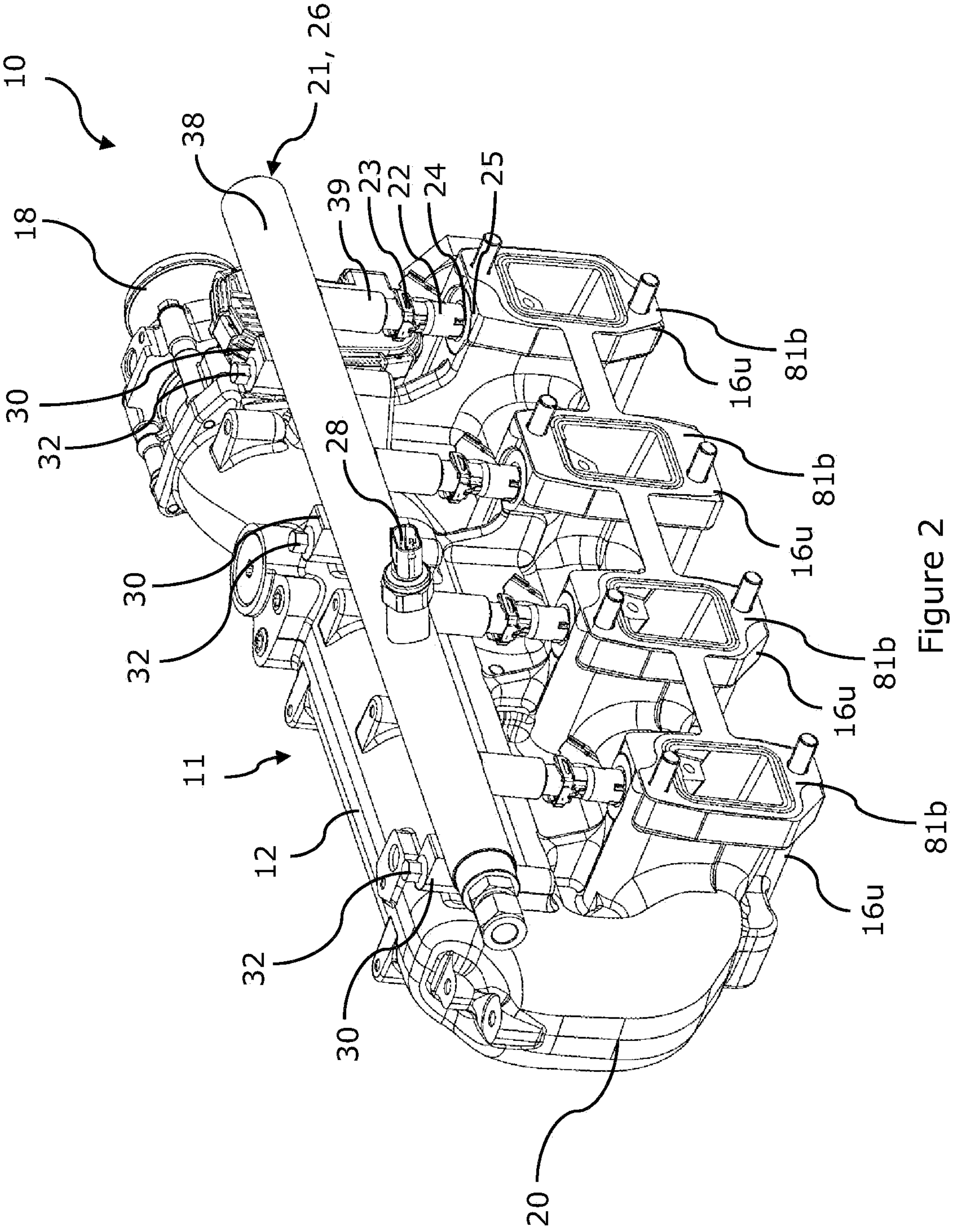
FIG. 2 is a front isometric view of an intake assembly according to an embodiment of the present teachings.
Figure 3:
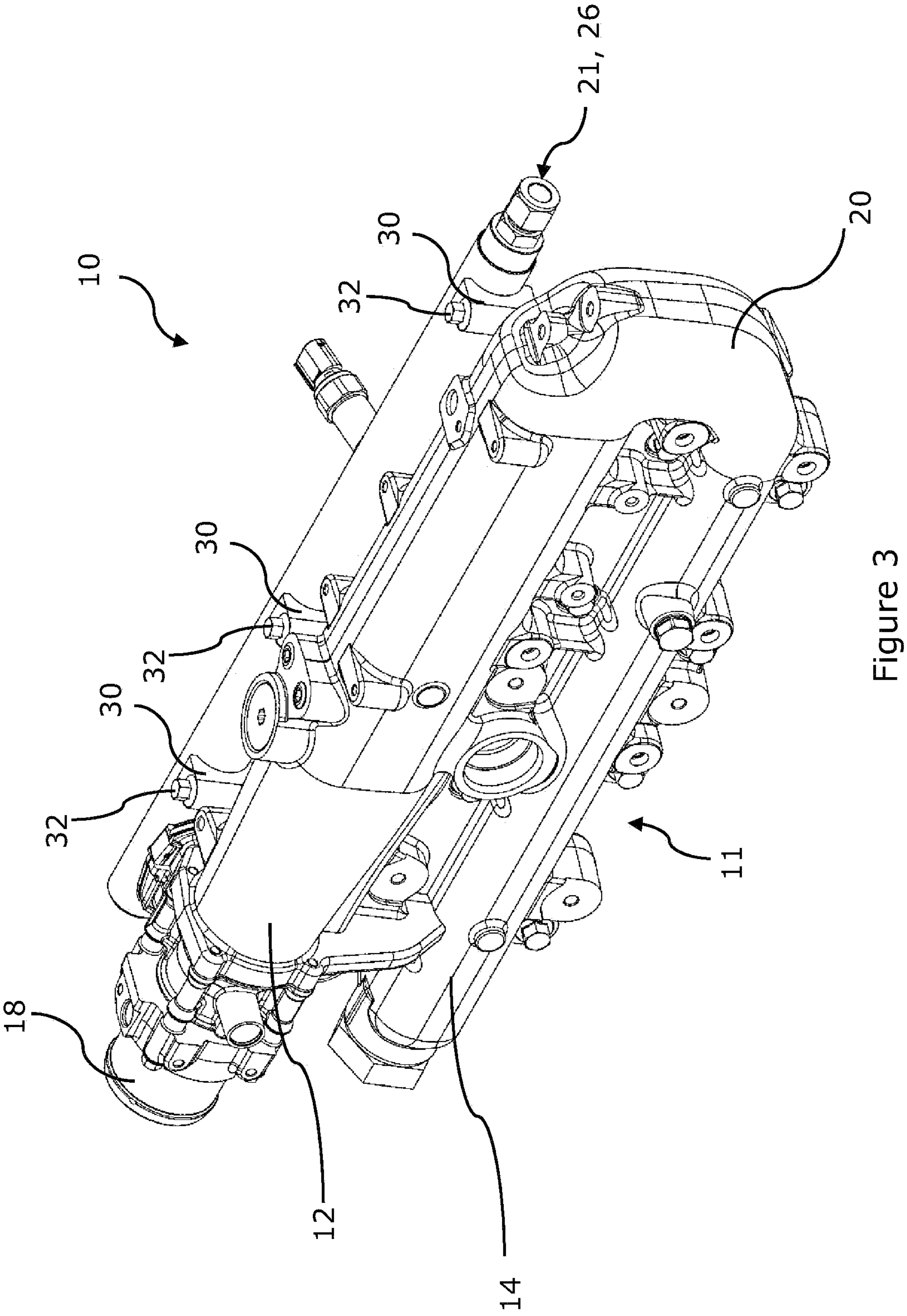
FIG. 3 is a rear isometric view of the intake assembly of FIG. 2.
Figure 4:
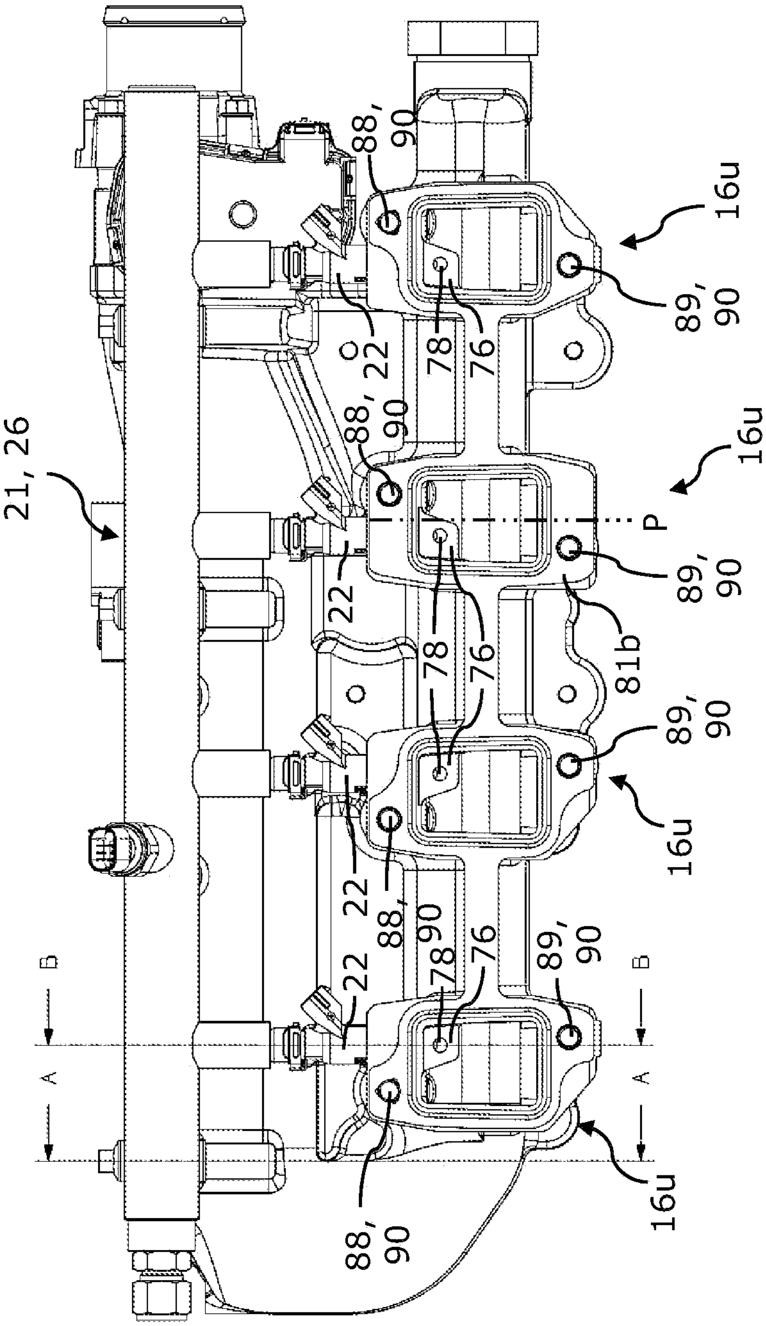
FIG. 4 is a front view of the intake assembly of FIG. 2.

Referring to FIGS. 2 to 4, the intake assembly 10 includes an intake manifold 11. The intake manifold 11 includes a first plenum 12, a second plenum 14, and upstream portions

16*u* of the plurality of intake runners 16. As shown in FIGS. 1B and 1C, each upstream portion 16*u* leads to one of the downstream portions 16*d*.

The first plenum 12 includes an air supply inlet 18. The upstream portions 16*u* of the intake runners 16 are configured to be couplable to the cylinder head 3 for supplying an air-fuel mixture to the intake ports 4. The intake manifold 11 is configured such that, in use, air is supplied from the air supply inlet 18 to the intake runners 16 via the first plenum 12.

In the illustrated embodiment, the first plenum 12 and the second plenum 14 are fluidly connected (i.e. in fluid communication with each other) via a third plenum 20. The intake runners 16 are fluidly connected to, and extend from, the second plenum 14. In use, air supplied through the air supply inlet 18 travels sequentially along the first plenum 12, the third plenum 20, the second plenum 14, and the intake runners 16.

As shown in FIGS. 1B and 1C, the first plenum 12 is arranged above the second plenum 14, in use.

With further reference to FIG. 1B, the first plenum 12 is elongate extending along a first longitudinal axis 12*x*. The second plenum 14 is elongate extending along a second longitudinal axis 14*x*. The first longitudinal axis 12*x* of the first plenum 12 and the second longitudinal axis 14*x* of the second plenum 14 are substantially parallel to each other.

The third plenum 20 is provided at an end downstream of the first plenum 12 and connects the first plenum to an upstream end of the second plenum 14.

Advantageously, such a configuration of the first plenum 12, the second plenum 14 and the third plenum 20 increases the capacity of the intake manifold 11 between the air supply inlet 18 and the intake runners 16, whilst ensuring the compactness of the intake manifold 11. This may be advantageous if the intake manifold 11 includes provision for exhaust gas recirculation (EGR) as a way of reducing emissions and/or improving efficiency. EGR may not be required for all engine applications, but it is nevertheless advantageous to utilize a standardized intake manifold 11 as far as is practicable.

As shown in FIG. 1B, the first plenum 12 is tilted away from the cylinder head 3 relative to the second plenum 14. In particular, the first plenum 12 is tilted at a non-zero tilt angle T to the second plenum 14 with respect to a vertical reference plane V. In FIG. 1B, the vertical reference plane V is parallel to and intersects the second longitudinal axis 14*x*. The tilt angle T may be in the range of 0.5 to 4.5 degrees, optionally 1.5 to 3.5 degrees, optionally 2.0 to 3.0 degrees. For example, the tilt angle T may be 2.5 degrees.

Advantageously, tilting the first plenum 12 away from the cylinder head 3 relative to the second plenum 14 helps increase the space available for components of the intake assembly 10 located between the first plenum 12 and the cylinder head 3, whilst ensuring the compactness of the intake manifold 11.

In alternative embodiments (not shown), the first plenum 12 may have any suitable position relative to the second plenum 14, or only a single plenum may be utilized.

The intake assembly 10 further includes a preassembled fuel rail unit 21. The fuel rail unit 21 is configured such that it can be preassembled prior to being mounted to the remainder of the intake assembly 10, which reduces the time and complexity of assembling the intake assembly 10.

The fuel rail unit 21 includes a plurality of fuel injectors 22. Each fuel injector 22 includes an injector tip 60 (see FIG. 6) arranged to open and close and selectively inject a fuel into one of the intake runners 16 with appropriate timing for the combustion cycle in the cylinder 5.

In the illustrated embodiment, each fuel injector tip 60 is received in a respective opening 24 in the intake manifold 11. Each opening 24 is in fluid communication with an internal passage of the corresponding intake runner 16, as will be discussed in more detail in the following.

Each opening 24 is in an external surface 25 of the respective intake runner 16. In the illustrated embodiment, the external surface 25 is substantially flat.

The fuel rail unit 21 further includes a fuel rail 26. The fuel rail 26 is coupled to the plurality of fuel injectors 22. The fuel rail 26 includes a fuel supply inlet 28. The fuel rail 26 is configured to supply fuel from the fuel supply inlet 28 to the plurality of fuel injectors 22, in use.

In the illustrated embodiment, the fuel rail 26 is configured to supply a gaseous fuel, such as hydrogen, to the fuel injectors 22. Moreover, each fuel injector 22 is configured to inject said gaseous fuel from the injector tip 60 thereof into the respective opening 24.

In alternative embodiments (not shown), the fuel rail 26 may be configured to supply a liquid fuel, such as gasoline (petroleum) or diesel, to the fuel injectors 22. Moreover, the fuel injectors 22 may be configured to inject said liquid fuel into the respective opening 24.

The fuel rail 26 includes an elongate supply conduit 38 and a plurality of supply channels 39 extending from the supply conduit 38. The supply conduit 38 includes the fuel supply inlet 28. Each supply channel 39 is coupled to one of the fuel injectors 22 for supplying fuel from the fuel supply inlet 28 to the respective fuel injector 22 via the supply conduit 38.

The fuel rail 26 is mounted to the first plenum 12. Advantageously, since the first plenum 12 is arranged above the second plenum 14, the first plenum 12, and thus the fuel rail 26, may be easier to access than other portions of the intake manifold 11 to help simplify assembly, inspection or maintenance of the fuel rail 26.

The fuel rail unit 21 is configured such that the fuel injectors 22 are mountable to the fuel rail 26 prior to the mounting of the fuel rail 26 to the first plenum 12. Each fuel injector 22 is mounted to the respective supply channel 39 via a mounting arrangement 23. In this embodiment, the mounting arrangement includes a suitable clip 23. Advantageously, such a configuration enables the fuel rail 26 and the fuel injectors 22 to be preassembled separately to the remainder of the intake assembly 10, which reduces the time and complexity of assembling the intake assembly 10. In other embodiments the fuel injectors 22 are mounted to the fuel rail 26 via a screw fitting, bayonet fitting, press-fitting or the like.

The fuel rail unit 21 includes a plurality of brackets 30 attached to the fuel rail 26 for mounting the fuel rail 26 to the intake manifold 11. In the illustrated embodiment, the fuel rail 26 is removably mounted to the first plenum 12 via the plurality of brackets 30. The brackets 30 are spaced from each other along a longitudinal axis of the fuel rail 26.

In alternative embodiments (not shown), the fuel rail 26 may be mounted to the first plenum 12 via a single bracket attached to the fuel rail 26.

Each bracket 30 is removably secured to the first plenum 12 via a mechanical fastener 32. In the embodiment illustrated in FIGS. 2 to 6, each mechanical fastener 32 is a bolt. In alternative embodiments (not shown), each mechanical fastener 32 may be any suitable mechanical fastener.

Figure 5:
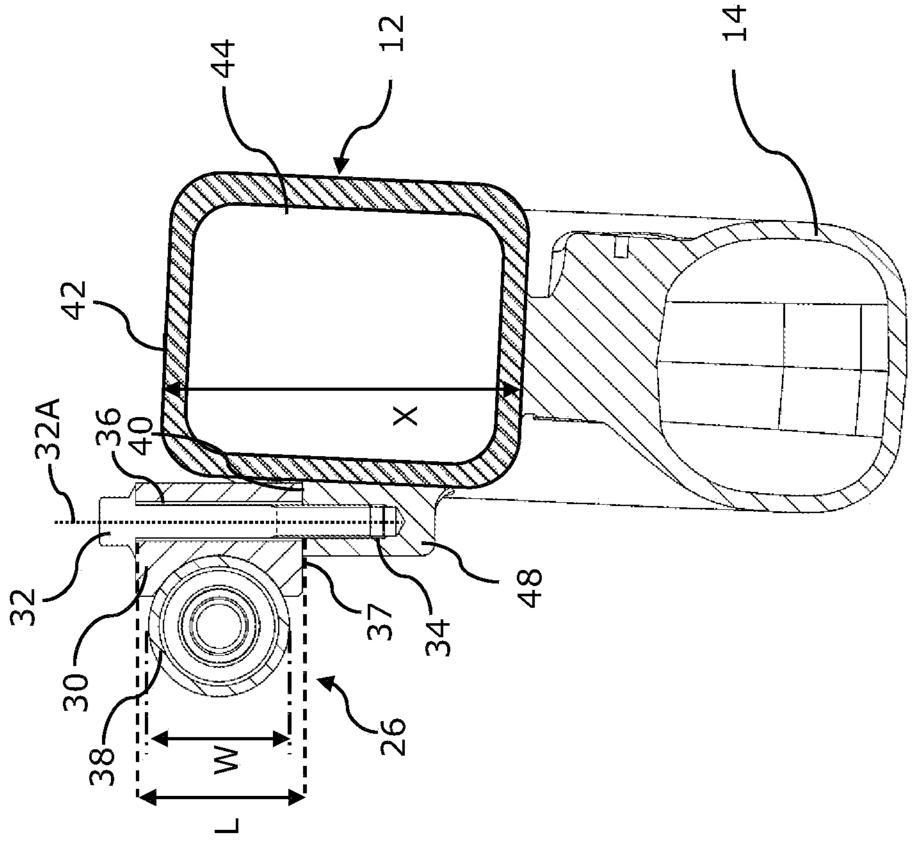
FIG. 5 is a cross-sectional profile view of the intake assembly along the section A-A shown in FIG. 4.

FIG. 5 shows a cross-sectional view of the intake assembly 10 along the section A-A shown in FIG. 4.

With further reference to FIG. 5, the first plenum 12 includes a plurality of first bores 34. Each bracket 30 includes a second bore 36. Each mechanical fastener 32 is received in the one of the first bores 34 and one of the second bores 36 to secure the respective bracket 30 to the first plenum 12.

In alternative embodiments (not shown), in which the fuel rail 26 is mounted to the first plenum 12 via a single bracket 30, the first plenum 12 may include a single first bore 34.

In the illustrated embodiment, each first bore 34 is a threaded bore, and each mechanical fastener 32 is a threaded bolt. Each first bore 34 is a blind bore.

In alternative embodiments (not shown), the first bore 34 may be an unthreaded (e.g. smooth) bore. In such embodiments, the first bore 34 may be a through bore.

Each second bore 36 extends through a planar mounting surface 37 of the respective bracket 30. In the illustrated embodiment, each second bore 36 is a through bore.

In alternative embodiments (e.g, as shown in FIG. 1C), the intake manifold 11 may include two or more studs 32' secured to and extending upwardly from the first plenum 12, each stud 32' configured to be received in one of the second bores 36 of the brackets 30. The studs may have similar positions as the bolts 32 shown in FIGS. 2 to 6. In such embodiments, each stud 32' may have a proximal portion secured to the first plenum 12, and a threaded distal portion. Each bracket 30 may be mounted to the first plenum 12 by inserting each stud through the respective second bore 36 until the distal portion is proud of the bracket 30, and tightening a nut 33' onto the threaded distal portion of each stud 32'. In such embodiments, the studs 32' may extend substantially vertically upwards from the first plenum 12, in use. Advantageously, the studs may act as guides, helping to ensure proper alignment of the fuel rail 26 and the fuel injectors 22 when assembling the intake assembly 10. In other respects, the stud 32' and nut 33' perform a similar function to the bolted connection.

With further reference to FIG. 2 to 4, each bracket 30 is attached to the supply conduit 38.

In the illustrated embodiment, the brackets 30 and the supply conduit 38 are each formed from a metallic material, such as steel. The brackets 30 are attached to the supply conduit 38 via a metal joining process such as welding or brazing for example. In alternative embodiments (not shown), the brackets 30 may be attached to the supply conduit 38 via any suitable means. For example, the brackets 30 and the supply conduit 38 may be formed as a single monolithic piece of material, e.g. a single casting or single forging.

In alternative embodiments (not shown), one or more of the brackets 30 may be attached to other portions of the fuel rail 26 besides the supply conduit 38. For example, to one or more of the supply channels 39.

In the illustrated embodiment, the supply conduit 38 extends substantially parallel to the longitudinal axis of the first plenum 12. Advantageously, such a configuration helps to improve the compactness of the intake assembly 10.

The second bore 36 of each bracket 30 extends substantially perpendicular to a longitudinal axis of the supply conduit 38. As shown in FIG. 5, a length L of each second bore 36 is greater than a transverse width W of the supply conduit 38. The transverse width W of the supply conduit 38 is measured transverse to the longitudinal axis of the supply conduit 38 along which it predominantly extends. Advantageously, together with a suitably dimensioned mechanical fastener, such a configuration helps to provide a rigid and robust connection between the fuel rail 26 and the intake manifold 11 in which the desired alignment of the two components may be readily maintained.

The fuel rail 26 is mounted to a plurality of mounting surfaces 40 of the first plenum 12. Each mounting surface 40 includes an opening leading to one of the first bores 34. Each mounting surface 40 abuts against one of the mounting surfaces 37 of the brackets 30 when said bracket 30 is secured to the first plenum 12.

In the illustrated embodiment, each mounting surface 40 is arranged to face substantially upwards in use, as shown in FIG. 1. Advantageously, the upward facing mounting surfaces 40 may help to simplify mounting/dismounting of the fuel rail 26 to/from the intake manifold 11, in use.

In the illustrated embodiment, each mounting surface 40 is substantially planar, achieved e.g. by machining a bare cast surface. Advantageously, the substantially planar mounting surfaces 40 may act as an alignment feature, to help ensure proper orientation of the fuel rail 26, and thus the fuel injectors 22, relative to the intake manifold 11.

Each mounting surface 40 is arranged below an uppermost extent 42 of the first plenum 12 (see FIG. 5), in use. Advantageously, arranging the mounting surfaces 40 below an uppermost extent 42 of the first plenum 12, in use, may help to enhance the compactness of the intake assembly 10.

As shown in FIG. 5, the uppermost extent of the first plenum 12 is spaced from a lowermost extent of the first plenum 12 by a distance X.

In the illustrated embodiment, each mounting surface 40 is arranged at least one quarter of the distance X from the uppermost extent 42 of the first plenum 12 towards the lowermost extent of the first plenum 12, in use.

In alternative embodiments (not shown), each mounting surface 40 may be arranged less than one quarter of the distance X from the uppermost extent 42 of the first plenum 12, in use.

In alternative embodiments (not shown), each mounting surface 40 may be level with or above the uppermost extent 42 of the first plenum 12, in use.

In alternative embodiments (not shown), the first plenum 12 may include a single mounting surface 40. In such embodiments, the fuel rail 26 may be mounted to the first plenum 12 via a single bracket 30. Alternatively, the fuel rail 26 may be mounted to the first plenum via a plurality of brackets 30, each bracket 30 secured to a single mounting surface 40.

With reference to FIG. 5, the first plenum 12 includes a closed wall 44 enclosing a cavity 46. The cavity 46 is in fluid communication with the air supply inlet 18, the second plenum 14, the third plenum 20, and the intake runners 16. The first plenum 12 includes a plurality of mounting platforms 48 extending from the closed wall 44. Each mounting platform 48 includes one of the mounting surfaces 40. Each first bore 34 extends into one of the mounting platforms 48.

In the illustrated embodiment, the mounting platforms 48 and the closed wall 44 are formed as a single monolithic piece of material, e.g. a single casting or single forging. Advantageously, the mounting platforms 48 may help to provide a robust and rigid connection between the first plenum 12 and the fuel rail 26.

In alternative embodiments (not shown), the first plenum 12 may include a single mounting platform 48. In such embodiments, the single mounting platform 48 may include one or more first bores 34.

Each mechanical fastener 32 extends predominantly along a longitudinal axis 32A thereof. In the illustrated embodiment, the longitudinal axes 32A of the mechanical fasteners 32 are parallel to each other. In an exemplary embodiment, the longitudinal axes 32A lie in a common plane.

Figure 6:
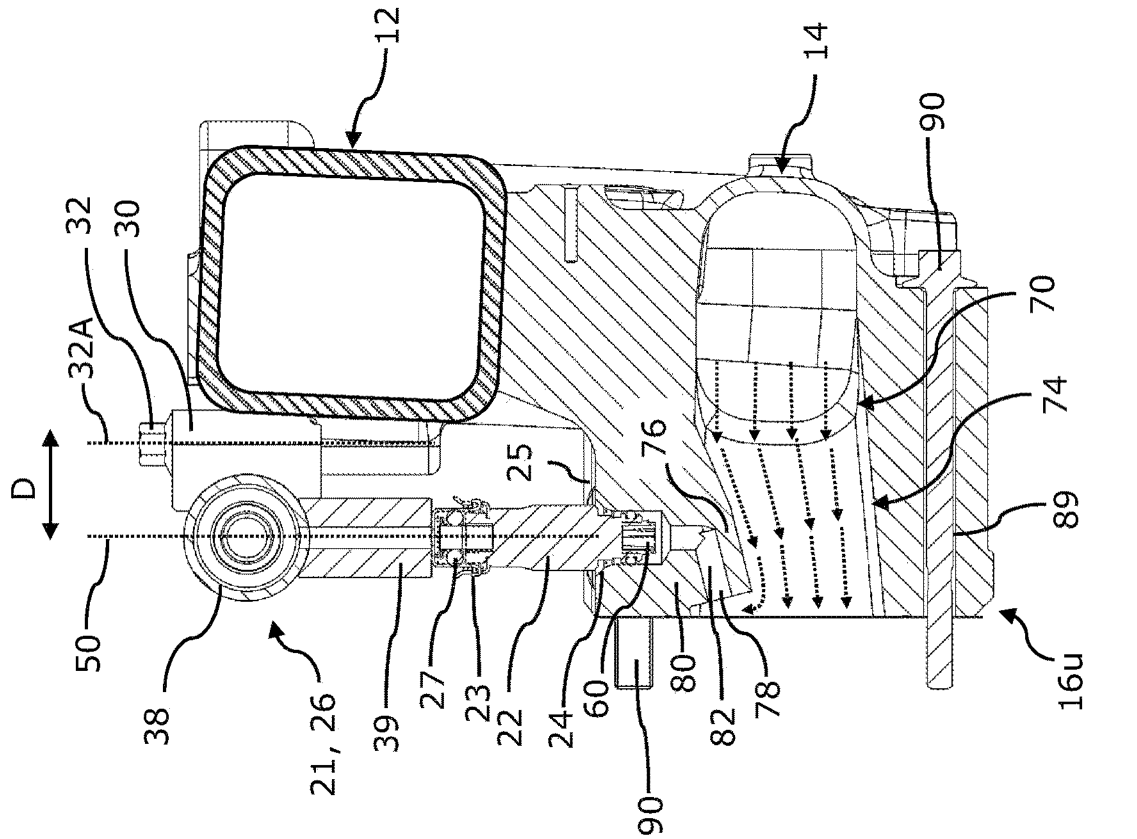
FIG. 6 is a cross-sectional profile view of the intake assembly along the section B-B shown in FIG. 4.

FIG. 6 shows a cross-sectional view of the intake assembly 10 along the section B-B shown in FIG. 4.

With further reference to FIG. 6, each supply channel 39 extends substantially transversely to the longitudinal axis of the supply conduit 38. In the illustrated embodiment, the supply channels 39 extend from the supply conduit 38 substantially parallel to each other.

Each supply channel 39 extends from the supply conduit 38 along an axis 50. Each fuel injector 22 extends from the respective supply channel 39 along the respective axis 50. As such, each fuel injector 22 extends from the fuel rail 26 substantially transversely to the longitudinal axis of the supply conduit 38.

The fuel injectors 22 extend from the fuel rail 26 in a common direction, and the axes 50 are substantially parallel to each other. In the illustrated embodiment, the fuel injectors 22 extend substantially vertically downwards from the fuel rail 26. With further reference to FIG. 5, the mounting surfaces 37 of the brackets 30 face the common direction, i.e. the mounting surfaces 37 face the same direction in which the fuel injectors 22 extend from the fuel rail 26. Each mounting surface 37 is substantially perpendicular to the axes 50. Advantageously, the mounting surfaces 37 help ensure proper alignment of the fuel rail unit 21 relative to the intake manifold 11 when the brackets 30 are mounted to the first plenum 12.

In the illustrated embodiment, each axis 50 is substantially parallel to the longitudinal axes 32A of the mechanical fasteners 32. As such, the fuel injectors 22 extend from the fuel rail 26 substantially parallel to the longitudinal axis 32A of each mechanical fastener 32. Longitudinal axes of the first bore 34 and the second bore 36 are aligned with the respective longitudinal axes 32A of the mechanical fasteners 32.

In the illustrated embodiment, each opening 24 extends into the intake runner 16 in a direction parallel to the respective axis 50.

In the illustrated embodiment, the fuel injectors 22 are offset from the mechanical fasteners 32 along a direction D perpendicular to the longitudinal axis of the supply conduit 38.

In the illustrated embodiment, the fuel injectors 22 are not directly secured to the intake runners 16. Instead, the fuel injectors 22 are inhibited from exiting the respective openings 24 via the mounting of the fuel rail 26 to the first plenum 12. It will be appreciated from FIG. 6 that the fuel injectors 22 are inhibited from exiting the respective openings 24 via a cantilever force provided by the securing of the brackets 30 to the first plenum 12 via the offset mechanical fasteners 32.

Advantageously, such a configuration negates the need to separately secure the fuel injectors 22 to the intake manifold 11, simplifying assembly of the intake assembly 10.

Figure 7:
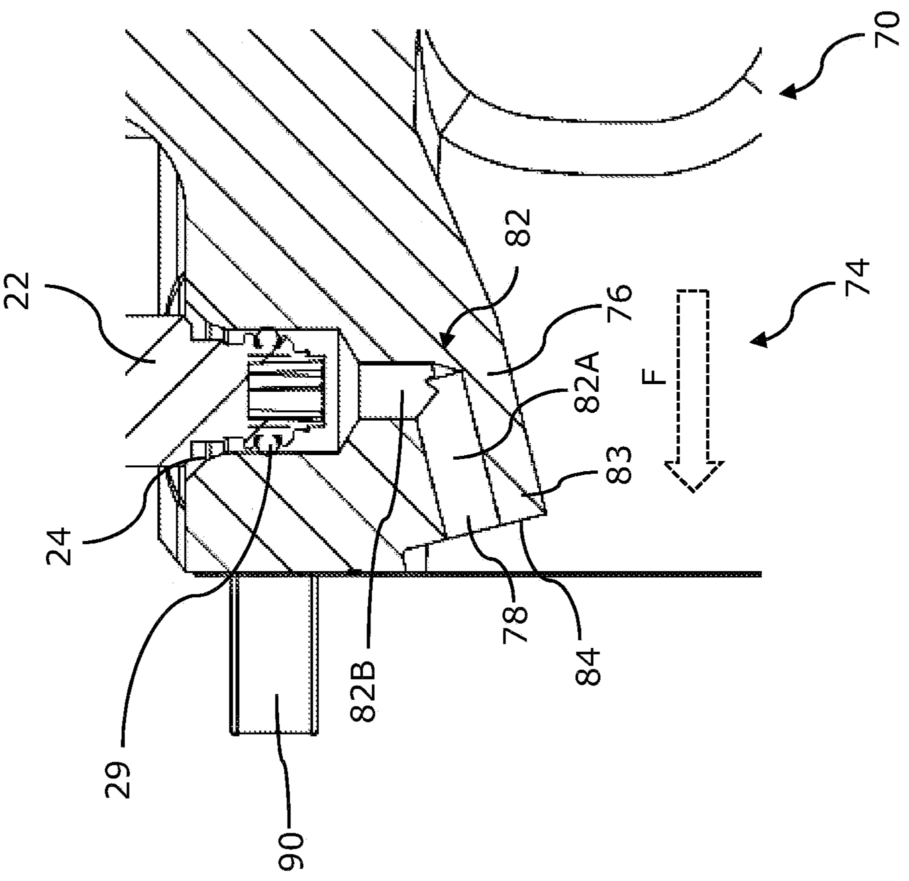
FIG. 7 is a magnified view of a portion of FIG. 6.

With reference to FIGS. 6 and 7, the intake assembly 10 includes a plurality of first sealing members 27, and a plurality of second sealing members 29. Each first sealing member 27 is arranged to seal the interface between one of the fuel injectors 22 and the corresponding supply channel 39. Each second sealing member 29 is arranged to seal the interface between one of the fuel injectors 22 and the corresponding opening 24. The sealing members 27, 29 may be of any suitable type, such as O-rings for example.

The intake assembly 10 is configured such that, during assembly, once the fuel injectors 22 are received in the respective openings 24, the mounting of the brackets 30 to the mounting surfaces 40 via the mechanical fasteners 32 aligns the sealing members 27, 29 concentrically and coaxially with the supply channels 39 and the openings 24 respectively to provide gas-tight seals between the fuel injectors 22 and the fuel rail 26, and the fuel injectors 22 and the respective intake runners 16. In the illustrated embodiment, the positions of the first bores 34 and the second bores 36 are chosen to ensure the accurate concentric alignment of the sealing members 27, 29.

In the illustrated embodiment, each axis 50 is substantially parallel to a longitudinal axis C of the cylinder 5 of the engine 1 (see FIGS. 1B and 1C). As such, the fuel injectors 22 extend from the fuel rail 26 substantially parallel to the axis C of the cylinder 5. Advantageously, such a configuration helps to enhance the compactness of the intake assembly 10 and ease of assembly on a production line or during maintenance operations.

With reference to FIG. 1, the fuel rail 26 is arranged above the intake runners 16, the cylinder block 2, and the cylinder head 3, in use. Advantageously, such a configuration may help to enhance access to the fuel rail 26, in use, for maintenance or inspection.

In alternative embodiments (not shown), the fuel rail 26 may not be above the cylinder head 3. In such embodiments, the fuel rail 26 may not be above the cylinder block 2.

A method of assembling the intake assembly 10 will now be described in the following.

In a first step, the fuel injectors 22 are mounted to the fuel rail 26 via the respective mounting arrangements 23.

In a subsequent step, the fuel injectors 22 are received in the respective openings 24.

In a subsequent step, the fuel rail 26 is mounted to the first plenum 12 via the brackets 30 and secured in place with the mechanical fastenings 32/33' as previously described. As such, the fuel injectors 22 are inhibited from exiting their respective openings 24 via the mounting of the fuel rail 26 to the first plenum 12.

With reference to FIGS. 1B and 6, each intake runner 16 includes an air inlet portion 70, an outlet portion 72, and an intake passage 74 configured to transport air from the air inlet portion 70 to the outlet portion 72. In FIG. 1B, the air inlet portion 70 and the outlet portion 72 are identified by dash-dot-dot lines.

In the illustrated embodiment, air is supplied to the air inlet portion 70 from the air supply inlet 18 via the first plenum 12, the third plenum 20 and the second plenum 14 sequentially.

Each intake runner 16 includes a protrusion 76 projecting into the intake passage 74. The protrusion 76 is configured to disrupt air flowing along the intake passage 74 from the air inlet portion 70 to the outlet portion 72.

By “disrupt air flowing along the intake passage 74”, it is intended to mean that one or more characteristics of the air flowing along the intake passage 74 are changed relative to if the protrusion 76 was not present. The one or more characteristics of the air may include air speed, flow direction, vorticity and/or air pressure for example.

The example flow lines in FIG. 6 represent the change in localized flow direction caused by the presence of the protrusion 76.

The protrusion 76 includes a fuel orifice 78 within the intake passage 74. The fuel orifice 78 is in fluid communication with the opening 24 such that, in use, a fuel injected into the opening 24 is injected into the intake passage 74 via the fuel orifice 78.

Advantageously, the protrusion 76 may enhance mixing of the air and the fuel in the intake passage 74 downstream of the fuel orifice 78, especially when the fuel is a gaseous fuel such as hydrogen, which may help to improve the combustion efficiency of the engine 1.

Each intake runner 16 includes a closed wall 80 defining the intake passage 74. In the illustrated embodiment, the upstream portion 16_u_ of each intake runner 16 includes the closed wall 80. The closed wall 80 includes the external surface 25 in which the opening 24 is provided. The opening 24 is wholly within the closed wall 80. Advantageously, such a configuration helps to ensure a compact design of the intake runner 16.

In this embodiment, the protrusion 76 and the closed wall 80 are formed as a single monolithic piece of material, e.g. as a single casting or single forging. Advantageously, forming the closed wall 80 and the protrusion 76 as a single monolithic piece of material helps to ensure a robust and strong connection between the closed wall 80 and the protrusion 76, which may help to increase the lifespan of the intake runner 16. In other embodiments the protrusion and the closed wall may be formed of separate pieces of material, or a portion of the closed wall 80 may be monolithic with the protrusion 76, but another part of the closed wall may be separate.

In the illustrated embodiment, the upstream portions 16_u_ of the intake runners 16 and the second plenum 14 are formed as a single monolithic piece of material, e.g. a single casting or single forging. The downstream portions 16_d_ of the intake runners 16 are formed as part of the cylinder head 3, as can be seen in FIG. 1B, for example.

With reference to FIGS. 1B, the cylinder head 3 includes a first mounting face 81_a_ adjacent inlets to the downstream portions 16_d_ of the intake runners 16. With further reference to FIG. 2, the intake manifold 11 includes a second mounting face 81_b_ adjacent outlets to the upstream portions 16_u_ of the intake runners 16. The first mounting face 81_a_ and the second mounting face 81_b_ are mounted to each other via a plurality of mechanical fasteners 90 to form the intake runners 16. As such, each intake runner 16 is formed from two parts mounted to each other.

In alternative embodiments (not shown), each intake runner 16 may be formed as a single monolithic piece of material, e.g. a single casting or single forging. Alternatively, each intake runner 16 may be formed from three or more parts mounted to each other.

The upstream portion 16_u_ of each intake runner 16 includes a fuel injection passage 82 in fluid communication with the opening 24. The fuel orifice 78 provides an outlet of the fuel injection passage 82. The fuel injection passage 82 passes through the protrusion 76.

With further reference to FIG. 7, the fuel injection passage 82 includes a first linear portion 82A connected to a second linear portion 82B. The first linear portion 82A is adjacent the fuel orifice 78. The second linear portion 82B is adjacent the opening 24. A longitudinal axis of the first linear portion 82A and a longitudinal axis of the second linear portion 82B form an internal obtuse angle. Advantageously, such a configuration may help to enhance the turbulence of fuel travelling through the fuel injection passage 82, especially when the fuel is a gaseous fuel such as hydrogen, which may help to enhance mixing of the fuel and air in the intake passage 74.

As the portion 82A directs the fuel in the same general direction as the air flowing through the intake passage, it reduces the likelihood of unwanted backflow of fuel into the intake manifold 11 where it may present a backfire risk under certain conditions and/or permit the fuel to flow into other cylinders and unbalance the engine.

In the illustrated embodiment, the fuel orifice 78 provides an outlet from the first linear portion 82A. The opening 24 provides an inlet to the second linear portion 82B.

In the illustrated embodiment, a longitudinal axis of the opening 24 is aligned with the longitudinal axis of the second linear portion 82B. A cross-sectional area of the opening 24 along the longitudinal axis thereof is greater than a cross-sectional area of the second linear portion 82B along the longitudinal axis thereof. Advantageously, such a configuration may help to increase the pressure of the fuel exiting the fuel injector 22 and passing through the fuel injection passage 82, which may help to enhance mixing of fuel and air in the intake passage 74.

In the illustrated embodiment, the longitudinal axis of the opening 24 and the longitudinal axis of the second linear portion 82B are aligned with the respective axis 50 previously discussed.

The fuel injection passage 82 and the fuel orifice 78 are configured to direct fuel exiting the fuel orifice in a direction substantially towards the outlet portion 72.

In the illustrated embodiment, the protrusion 76 includes an orifice face 84. The orifice face 84 includes the fuel orifice 78. The orifice face 84 faces in a direction substantially towards the outlet portion 72. The orifice face 84 is substantially flat. The orifice face 84 is substantially normal to the longitudinal axis of the first linear portion 82A of the fuel injection passage 82.

A cross-sectional area of the fuel orifice 78 in a plane normal to the longitudinal axis of the first linear portion 82A is in the range of 20 mm2 to 40 mm2, optionally in the range of 25 mm2 to 35 mm2, optionally in the range of 30 mm2 to 33 mm2. In the illustrated embodiment, the cross-sectional area of the fuel orifice 78 in a plane normal to the longitudinal axis of the first linear portion 82A is approximately 31.2 mm2.

A wall 83 surrounds and defines the fuel orifice 78. A minimum thickness of the wall 83 is in the range of 2.5 mm to 8.5 mm, optionally in the range of 3.5 mm to 7.5 mm, optionally in the range of 4.5 mm to 6.5 mm. In the illustrated embodiment, the wall 83 has a minimum thickness of approximately 5.3 mm.

The longitudinal axis of the first linear portion 82A of the fuel injection passage 82 intersects the outlet portion 72. As such, fuel injected into the opening via the fuel injector 22 is injected out of the fuel orifice 78 in a direction substantially towards the outlet portion 72.

In the illustrated embodiment, the fuel injection passage 82 and the fuel orifice 78 are configured to direct fuel exiting the fuel orifice 78 at a non-zero angle to the mean flow direction F of the air passing through the intake passage 74. In FIG. 7, the mean flow direction F is represented schematically via an arrow.

In the illustrated embodiment, the orifice face 84 is oriented at a non-zero angle to a plane which is normal to the mean flow direction F. In the illustrated embodiment, the orifice face 84 is oriented at a non-zero acute angle to said plane.

To form the orifice face 84, the protrusion 76 and the closed wall 80 are initially formed as a single monolithic piece of material, e.g. as a single casting or single forging, in which the protrusion 76 extends coplanar to a downstream face of the upstream portion 16_u_ of the intake runner 16. Subsequently, said single monolithic piece of material is machined to form the orifice face 84. Advantageously, this process helps ensure that the orifice face 84 is substantially normal to the fuel injection passage 82 at the fuel orifice 78 to provide an even spray pattern.

In alternative embodiments (not shown), the orifice face 84 may have any suitable orientation, e.g. substantially parallel to a plane which is normal to the mean flow direction F.

The longitudinal axis of the first linear portion 82A of the fuel injection passage 82 is oriented at an acute angle to the mean flow direction F. As such, fuel injected into the opening via the fuel injector 22 is injected out of the fuel orifice 78 in generally the same direction mean flow direction F.

In alternative embodiments (not shown), the longitudinal axis of the first linear portion 82A of the fuel injection passage 82 may be oriented parallel, i.e. at a zero angle, to the mean flow direction F.

The longitudinal axis of the first linear portion 82A is oriented at an angle to the horizontal (which in the present embodiment substantially equates to the mean flow direction F and normal to axis C), in the range of 0 to 25 degrees, and optionally in the range of 10 to 20 degrees. In the illustrated embodiment, the longitudinal axis of the first linear portion 82A is oriented at an angle of 14 degrees to the horizontal/mean flow direction, in use.

With reference to FIG. 1C, the intake port 4 includes the inlets 6. The inlet valves 7*i* extend through the intake port 4. The intake port 4 has a width W measured along the axis of the inlet valve 7*i* closest to the intake manifold 11. In this embodiment, the longitudinal axis A of the first linear portion 82A intersects the axis of the closest inlet valve 7*i* at a position greater than 50%, optionally greater than 60%, optionally greater than 70%, of the width W from the corresponding inlet 6.

Advantageously, such orientations of the first linear portion 82A have been found to provide good mixing between fuel and air in the intake port 4, and to inhibit backflow of fuel exiting the fuel orifice 78 into the second plenum 14, in use.

In the illustrated embodiment, the downstream portion 16*d* of the intake runner 16 is wider than the intake port 4. With reference to FIG. 1B, a minimum distance L1 between the fuel orifice 78 and the inlet valve 7*i* closest to the intake manifold 10 is in the range of 95 mm to 125 mm, optionally in the range of 100 mm to 120 mm, optionally in the range of 105 mm to 115 mm. In the illustrated embodiment, the distance L1 is approximately 108 mm.

A minimum distance L2 between the second longitudinal axis 14*x* of the second plenum 14 and the inlet valve 7*i* closest to the intake manifold 11 is in the range of 170 mm to 200 mm, optionally in the range of 175 mm to 195 mm, optionally in the range of 180 mm to 190 mm. In the illustrated embodiment, the distance L2 is approximately 184 mm.

The minimum distance L1 is a proportion of the minimum distance L2 in the range of 45% to 75%, optionally in the range of 55% to 65%. In the illustrated embodiment, the minimum distance L1 is approximately 59% of the minimum distance L2.

Additionally, as shown schematically in FIG. 1B, the protrusion 76 generates a low velocity region LV of airflow when no fuel injection is occurring.

In this embodiment this is depicted as being generally bounded by the dotted line in FIG. 1B. It will be appreciated that the fuel is injected into this low velocity region LV. This may be beneficial for fuel-air mixing and/or minimizing back-flow of the fuel.

The longitudinal axis of the opening 24 is substantially perpendicular to the mean flow direction F.

With reference to FIG. 4, the opening 24 and the fuel orifice 78 are substantially offset from a center plane P of the intake passage 74. The center plane P is represented as a dash-dot-dot line in FIG. 4, and extends into the page. The center plane P is substantially parallel to the longitudinal axis of the opening 24, and substantially bisects the intake passage 74.

By "substantially offset from the center plane P", it is intended to mean that the majority or all of the opening 24 and the fuel orifice 78 are arranged to one side of the center plane P.

In the illustrated embodiment, the protrusion 76 is substantially offset from the center plane P.

With reference to FIG. 4, the upstream portion 16*u* of each intake runner 16 includes a first aperture 88 for receiving a mechanical fastener 90, such as a bolt, therein for mounting the upstream portion 16*u* of the intake runner 16 to the cylinder head 3 of the engine 1, for supplying fuel and air to the cylinder head 3. The first aperture 88 is arranged adjacent the opening 24 and the fuel orifice 78, and on an opposite side of the center plane P relative to the opening 24 and the fuel orifice 78. Advantageously, such a configuration enables the opening 24, the fuel injection passage 82 and the fuel orifice 78 to bypass the first aperture 88, and for the injector 22 to avoid blocking the first aperture 88, whilst ensuring a compact design of the intake runner 16.

In the illustrated embodiment, each first aperture 88 extends through the mounting face 81*b* surrounding the respective upstream portion 16*u* of each intake runner 16.

In the illustrated embodiment, a longitudinal axis of each first aperture 88 is substantially parallel to the mean flow direction F and substantially perpendicular to the longitudinal axis of the opening 24.

In alternative embodiments (not shown), the longitudinal axis of each first aperture 88 may not be substantially parallel to the mean flow direction F and/or the longitudinal axis of the opening 24.

The upstream portion 16*u* of each intake runner 16 includes a second aperture 89 for receiving a mechanical fastener 90, such as a bolt, therein for mounting said upstream portion 16*u* to the cylinder head 3 of the engine 1. The second aperture 89 extends through the mounting face 81*b* on an opposite side of the outlet of the respective upstream portion 16*u* to the first aperture 88. In the illustrated embodiment, the first aperture 88 is located on an opposite side of the center plane P to the second aperture 89.

As shown in FIG. 4, the intake passage 74 has a substantially rectangular profile along a direction from the air inlet portion 70 to the outlet portion 72. The protrusion 76 and the fuel orifice 78 are arranged in a corner of the rectangular profile of the intake passage 74.

In alternative embodiments (not shown), the protrusion 76 may not be arranged in a corner of the rectangular profile of the intake passage 74. In such embodiments, the fuel orifice 78 may not be arranged in a corner of the rectangular profile of the intake passage 74.

In alternative embodiments (not shown), the intake passage 74 may have any suitable non-rectangular profile.

The cross-sectional area of the protrusion 76 in a plane normal to the flow direction F is a proportion of the corresponding total cross-sectional area of the intake passage 74 in the range of 5% to 25%, optionally 10% to 20%. In the illustrated embodiment, the cross-sectional area of the protrusion 76 in a plane normal to the flow direction F is approximately 16% of the corresponding total cross-sectional area of the intake passage 74. Advantageously, it has been found that such a cross-sectional area of the protrusion 76 is low enough to reduce the effects of the drop in pressure of air flowing past the protrusion on the efficiency of the engine, whilst high enough to ensure that the wall of the protrusion 76 surrounding the fuel injection passage 82 is sufficiently thick for manufacturability, and to generate turbulence for enhanced fuel-air mixing.

Figure 8:
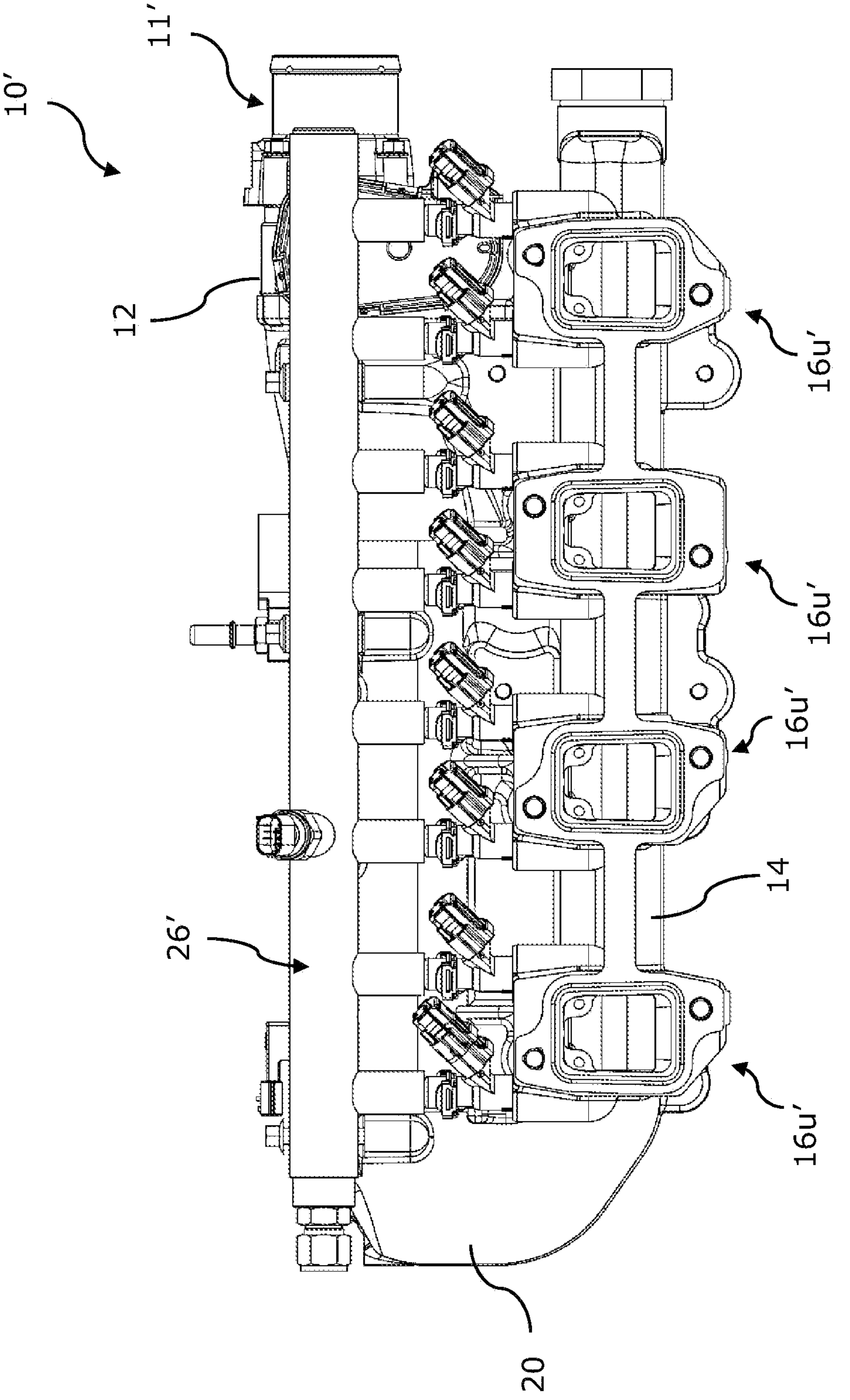
FIG. 8 is a front view of an intake assembly according to an embodiment of the present teachings.
Figure 9:
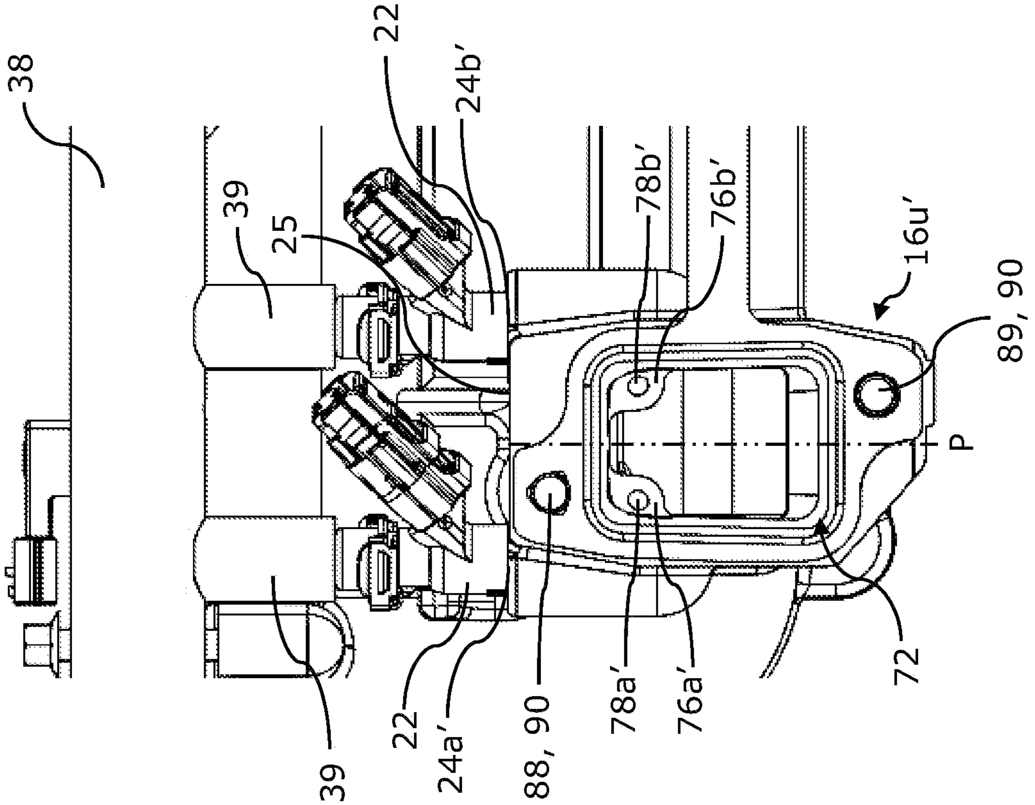
FIG. 9 is a magnified view of FIG. 8.

With reference to FIGS. 8 and 9, an alternative embodiment of an intake assembly 10' for the internal combustion engine 1 will now be described. Features in common with the intake assembly 10 of FIGS. 1A to 7 are denoted with common reference numerals and their description shall not be repeated for brevity.

The intake assembly 10' includes an intake manifold 11', a fuel rail 26' and a plurality of fuel injectors 22. The intake manifold 11' includes the first plenum 12, the second plenum 14, the third plenum 20, and a plurality of upstream portions **16*u*' of the intake runners 16**.

Each upstream portion **16*u*' includes a first opening 24*a*' in an external surface 25 of the upstream portion 16*u*' for receiving an injector tip 60 of a fuel injector 22 therein. Each upstream portion 16*u*' further includes a second opening 24*b*' in the external surface 25 for receiving an injector tip 60 of a fuel injector 22** therein.

Each upstream portion **16*u*' includes a first protrusion 76*a*' projecting into the intake passage 74 and a second protrusion 76*b*' projecting into the intake passage 74. The first protrusion 76*a*' and the second protrusion 76*b*' each configured to disrupt air flowing along the intake passage 74 from the air inlet portion 70 to the outlet portion 72**.

The first protrusion **76*a*' includes a first fuel orifice 78*a*' within the intake passage 74. The second protrusion 76*b*' includes a second fuel orifice 78*b*' within the intake passage 74. The first fuel orifice 78*a*' is in fluid communication with the first opening 24*a*' such that, in use, a fuel injected into the first opening 24*a*' is injected into the intake passage 74 via the first fuel orifice 78*a*'. The second fuel orifice 78*b*' is in fluid communication with the second opening 24*b*' such that, in use, a fuel injected into the second opening 24*b*' is injected into the intake passage 74 via the second fuel orifice 78*b*'**.

Advantageously, injecting fuel from two fuel injectors 22 into the intake passage 74 of each intake runner 16' increases the amount of fuel that may be injected into the intake passage 74, and thus into each cylinder 5.

The fuel rail 26' is similar to the fuel rail 26 of FIGS. 1 to 7, and has been suitably modified to supply fuel to the two fuel injectors 22 arranged to inject fuel into each intake runner 16'.

Although not shown, a first fuel injection passage fluidly connects the first opening **24*a*' to the first fuel orifice 78*a*', and a second fuel injection passage fluidly connects the second opening 24*b*' to the second fuel orifice 78*b*', in a similar manner to the fuel injection passage 82 of FIGS. 1 to 7. In this embodiment the first linear portions of the fluid injection passages are angled inwardly towards the plane P, however. This is as a result of the required spacing between the adjacent injectors to allow a bolt to be inserted into the apertures 88, 89**.

Each upstream portion **16*u*' includes the first aperture 88 and the second aperture 89**.

In the illustrated embodiment, the first aperture 88 is interposed between the center plane P of the intake passage 74 and the first opening **24*a*'. The aperture 88 and the first fuel orifice 78*a*' both intersect a plane parallel to the center plane P. The first fuel injection passage is configured to bypass the aperture 88**. The second fuel injection passage is substantially a mirror image of the first fuel injection passage about the center plane P.

In alternative embodiments (not shown), the upstream portions **16*u*, 16*u*' may extend from the first plenum 12 of the intake manifold 11, 11'. In such embodiments, the intake manifold 11, 11' may not include the second plenum 14 and the third plenum 20**.

In the foregoing description, the protrusion 76, **76*a*', 76*b*' comprises the fuel orifice 78, 78*a*', 78*b*'. In alternative embodiments (not shown), the intake runner 16 may not include the protrusion(s) 76, 76*a*', 76*b*'. In such embodiments, the fuel orifice 78, 78*a*', 78*b*' may be located in any suitable position in the intake passage 74; e.g. in the wall surrounding the intake passage 74, or at a distal end of a pipe, tube or conduit in fluid communication with one of the fuel injectors 22 and located within the intake passage 74**.

In the following, a method of manufacturing the intake runner 16 will now be described.

In a first step of the method, the intake runner 16 is formed via a casting or forging process, such that the closed wall 80 defining the intake passage 74, and each protrusion 76, **76*a*', 76*b*'** are formed as a single monolithic piece of material.

In another step of the method, each opening 24, **24*a*', 24*b*' is machined in the external surface 25 of the intake runner 16**. For example, via drilling, boring, or via any suitable machining process.

In another step of the method, each face surrounding the fuel orifice 78, **78*a*', 78*b*' is machined in the respective protrusion 76, 76*a*', 76*b*'**. For example, milling, or via any suitable machining process.

In another step, each fuel injection passage 82 is machined in the intake runner 16. For example, via drilling, boring, or via any suitable machining process. The step of machining each fuel injection passage 82 in the intake runner 16 may include machining the respective fuel orifice 78, **78*a*', 78*b*' in the respective protrusion 76, 76*a*', 76*b*'**.

The one or more embodiments are described above by way of example only and it will be appreciated that the variations are possible without departing from the scope of protection afforded by the appended claims.

The invention claimed is:

1. An intake assembly for an internal combustion engine, comprising:

an intake manifold including a first plenum and a plurality of intake runners, the first plenum comprising an air supply inlet, the intake runners configured to be couplable to a cylinder head of the engine for supplying an air-fuel mixture thereto, the intake manifold configured such that, in use, air is supplied from the air supply inlet to the intake runners via the first plenum;

a plurality of fuel injectors, each arranged to inject a fuel into one of the intake runners; and a fuel rail coupled to the plurality of fuel injectors, the fuel rail including a fuel supply inlet and configured to supply fuel from the fuel supply inlet to the plurality of fuel injectors, in use, wherein the fuel rail is mountable to the first plenum, and wherein the intake manifold comprises a second plenum in fluid communication with the first plenum and the intake runners, the intake runners extending from the second plenum, wherein the first plenum is arranged above the second plenum.

2. The intake assembly of claim 1, wherein the first plenum is elongate extending along a first longitudinal axis, wherein the second plenum is elongate extending along a second longitudinal axis, and wherein the first longitudinal axis and the second longitudinal axis are substantially parallel to each other.

3. The intake assembly of claim 1, wherein the fuel injectors are receivable in respective openings in the intake runners, and wherein the fuel injectors are prevented from exiting the respective openings only via the mounting of the fuel rail to the first plenum.

4. The intake assembly of claim 3, wherein the intake runners comprise a closed wall having a protrusion formed as a monolithic structure, the protrusion comprising a fuel injection passage in fluid communication with the respective opening and passing through the protrusion to a fuel orifice in an airflow path of the intake runner, wherein the fuel injection passage includes a first linear portion connected to a second linear portion, the first linear portion being adjacent a fuel orifice and the second linear portion being adjacent the respective opening, wherein a longitudinal axis of the first linear portion and a longitudinal axis of the second linear portion form an internal obtuse angle, wherein the first linear portion directs fuel from the injector in a direction aligned with an airflow path in the intake runner.

5. The intake assembly of claim 4, wherein the internal combustion engine comprises:

an intake port including an inlet leading to a cylinder of the engine; and an inlet valve configured to selectively open and close the inlet, wherein the outlet portion of the intake runner is in fluid communication with the intake port and wherein the longitudinal axis of the first linear portion intersects an axis of the inlet valve at a position greater than 50% of the width of the intake port from the inlet.

6. The intake assembly of claim 1, wherein the fuel rail is removably mounted to the first plenum via one or more brackets attached to the fuel rail, wherein the one or more brackets are removably securable to the first plenum via one or more mechanical fasteners, such as bolts or threaded studs and nuts.

7. The intake assembly of claim 6, wherein the fuel injectors extend from the fuel rail substantially parallel to a longitudinal axis of each of the one or more mechanical fasteners.

8. The intake assembly of claim 7, wherein the fuel rail is removably mountable to the first plenum via two or more brackets attached to the fuel rail, each bracket comprising a bore, wherein the intake manifold comprises two or more elongate mechanical fasteners extending from the first plenum, wherein each mechanical fastener being receivable in one of the bores and securable thereto to secure the bracket to the first plenum, wherein the mechanical fasteners extend substantially vertically upwards from the first plenum and provide guides for aligning the injectors with the intake runners when mounting the fuel rail.

9. The intake assembly of claim 1, wherein the fuel rail is configured to supply a gaseous fuel, such as hydrogen, to the fuel injectors, and wherein the fuel injectors are configured to inject said gaseous fuel into the intake runners, and/or wherein the fuel rail is arranged above the intake runners.

10. The intake assembly of claim 1, wherein the fuel rail comprises an elongate supply conduit and a plurality of supply channels extending therefrom, the supply conduit comprising the fuel supply inlet, wherein each supply channel is coupled to one of the fuel injectors for supplying fuel from the fuel supply inlet to the respective fuel injector via the supply conduit, wherein the supply channels extend substantially transversely to a longitudinal axis of the supply conduit, wherein the supply channels extend from the supply conduit substantially parallel to each other.

11. An intake assembly for an internal combustion engine, comprising:

an intake manifold including a first plenum and a plurality of intake runners, the first plenum comprising an air supply inlet, the intake runners configured to be couplable to a cylinder head of the engine for supplying an air-fuel mixture thereto, the intake manifold configured such that, in use, air is supplied from the air supply inlet to the intake runners via the first plenum;

a plurality of fuel injectors, each arranged to inject a fuel into one of the intake runners; and a fuel rail coupled to the plurality of fuel injectors, the fuel rail including a fuel supply inlet, and configured to supply fuel from the fuel supply inlet to the plurality of fuel injectors, in use, wherein the fuel rail is mountable to the first plenum, wherein the fuel injectors are receivable in respective openings in the intake runners, and wherein the fuel injectors are prevented from exiting the respective openings only via the mounting of the fuel rail to the first plenum, wherein the intake runners comprise a closed wall having a protrusion formed as a monolithic structure, the protrusion comprising a fuel injection passage in fluid communication with the respective opening and passing through the protrusion to a fuel orifice in an airflow path of the intake runner, wherein the fuel injection passage includes a first linear portion connected to a second linear portion, the first linear portion being adjacent a fuel orifice and the second linear portion being adjacent the respective opening, wherein a longitudinal axis of the first linear portion and a longitudinal axis of the second linear portion form an internal obtuse angle, and wherein the first linear portion directs fuel from the injector in a direction aligned with an airflow path in the intake runner.

12. The intake assembly of claim 11, wherein the internal combustion engine comprises:

an intake port including an inlet leading to a cylinder of the engine; and an inlet valve configured to selectively open and close the inlet, wherein the outlet portion of the intake runner is in fluid communication with the intake port, and wherein the longitudinal axis of the first linear portion intersects an axis of the inlet valve at a position greater than 50% of the width of the intake port from the inlet.

13. An intake assembly for an internal combustion engine, comprising:

an intake manifold including a first plenum and a plurality of intake runners, the first plenum comprising an air supply inlet, the intake runners configured to be couplable to a cylinder head of the engine for supplying an air-fuel mixture thereto, the intake manifold configured such that, in use, air is supplied from the air supply inlet to the intake runners via the first plenum;

a plurality of fuel injectors, each arranged to inject a fuel into one of the intake runners; and a fuel rail coupled to the plurality of fuel injectors, the fuel rail including a fuel supply inlet, and configured to supply fuel from the fuel supply inlet to the plurality of fuel injectors, in use, wherein the fuel rail is mountable to the first plenum, wherein the fuel rail is removably mounted to the first plenum via two or more brackets attached to the fuel rail, wherein the two or more brackets are removably securable to the first plenum via two or more elongate mechanical fasteners, wherein the fuel injectors extend from the fuel rail substantially parallel to a longitudinal axis of each of the two or more mechanical fasteners, wherein each bracket comprises a bore, wherein the intake manifold comprises the two or more mechanical fasteners extending from the first plenum, wherein each mechanical fastener being receivable in one of the bores and securable thereto to secure the bracket to the first plenum, and wherein the mechanical fasteners extend substantially vertically upwards from the first plenum and provide guides for aligning the injectors with the intake runners when mounting the fuel rail.

14. The intake assembly of claim 13, wherein the fuel rail comprises an elongate supply conduit, the fuel rail configured to supply fuel from the fuel supply inlet to the plurality of fuel injectors via the supply conduit, wherein the two or more brackets are attached to the supply conduit, and wherein the bore of each bracket extends substantially perpendicular to a longitudinal axis of the supply conduit, and, wherein a length of the bore is greater than a transverse width of the supply conduit.

15. The intake assembly of claim 13, wherein the fuel rail is mounted to one or more mounting surfaces of the first plenum, said one or more mounting surfaces arranged to face substantially upwards.

16. The intake assembly of claim 13, wherein the fuel rail is mounted to one or more mounting surfaces of the first plenum, said one or more mounting surfaces arranged below an uppermost extent of the first plenum.

17. The intake assembly of claim 16, wherein the one or more mounting surfaces are arranged at least one quarter of a distance from the uppermost extent of the first plenum towards a lowermost extent of the first plenum.

18. The intake assembly of claim 13, further comprising a plurality of sealing members, such as O-rings, arranged to seal interfaces between the fuel injectors and the fuel rail, and/or the fuel injectors and the corresponding intake runners, wherein the intake assembly is configured such that the mounting of the fuel rail to the first plenum aligns the sealing members concentrically and coaxially with the fuel rail and/or the intake runners respectively, at the interfaces thereof, to provide gas-tight seals.

19. The intake assembly of claim 13, wherein the plurality of fuel injectors are coupled to the fuel rail as a preassembled unit prior to being mounted to the first plenum and intake runners.

20. An intake assembly for an internal combustion engine, comprising:

an intake manifold including a first plenum and a plurality of intake runners, the first plenum comprising an air supply inlet, the intake runners configured to be couplable to a cylinder head of the engine for supplying an air-fuel mixture thereto, the intake manifold configured such that, in use, air is supplied from the air supply inlet to the intake runners via the first plenum;

a plurality of fuel injectors, each arranged to inject a fuel into one of the intake runners; and a fuel rail coupled to the plurality of fuel injectors, the fuel rail including a fuel supply inlet, and configured to supply fuel from the fuel supply inlet to the plurality of fuel injectors, in use, wherein the fuel rail is mountable to the first plenum, wherein the fuel rail comprises an elongate supply conduit and a plurality of supply channels extending therefrom, the supply conduit comprising the fuel supply inlet, wherein each supply channel is coupled to one of the fuel injectors for supplying fuel from the fuel supply inlet to the respective fuel injector via the supply conduit, wherein the supply channels extend substantially transversely to a longitudinal axis of the supply conduit, wherein the supply channels extend from the supply conduit substantially parallel to each other.

* * * * *